(12) United States Patent
Asao

(10) Patent No.: US 7,358,943 B2
(45) Date of Patent: Apr. 15, 2008

(54) COLOR DISPLAY APPARATUS

(75) Inventor: Yasufumi Asao, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 10/552,760

(22) PCT Filed: May 6, 2005

(86) PCT No.: PCT/JP2005/008740

§ 371 (c)(1),
(2), (4) Date: Jul. 7, 2006

(87) PCT Pub. No.: WO2005/109394

PCT Pub. Date: Nov. 17, 2005

(65) Prior Publication Data
US 2007/0132675 A1   Jun. 14, 2007

(30) Foreign Application Priority Data

May 6, 2004 (JP) ............................. 2004-137504
Apr. 27, 2005 (JP) ............................. 2005-130441

(51) Int. Cl.
*G09G 3/36* (2006.01)
(52) U.S. Cl. .......................................... 345/87; 88/690
(58) Field of Classification Search ................. 345/72, 345/77, 82–87, 80, 88–90, 92, 204, 214, 345/690, 698, 699; 348/30, 70, 71; 349/106
See application file for complete search history.

(56) References Cited

U.S. PATENT DOCUMENTS

| 4,907,862 | A | 3/1990 | Suntola ..................... 350/345 |
|---|---|---|---|
| 5,337,068 | A | 8/1994 | Stewart et al. ................ 345/88 |
| 6,154,191 | A | 11/2000 | Okita ........................... 345/95 |
| 6,177,921 | B1 | 1/2001 | Comiskey et al. .......... 345/107 |
| 6,466,280 | B1 | 10/2002 | Park et al. .................... 349/43 |
| 6,939,013 | B2 | 9/2005 | Asao ........................... 353/98 |

(Continued)

FOREIGN PATENT DOCUMENTS

EP   1 109 053   6/2001

(Continued)

*Primary Examiner*—Richard A. Hjerpe
*Assistant Examiner*—Mansour M. Said
(74) *Attorney, Agent, or Firm*—Fitzpatrick, Cella, Harper & Scinto

(57) ABSTRACT

A color display apparatus includes a display panel which has a light reflection area and a light transmission area for each pixel, and a light source for causing light to enter the display panel from a back surface. The light reflection area includes a first subarea in which the incident light is modulated and reflected in a brightness change range within which a brightness of a reflected light is variable and a hue change range within which a hue of a chromatic color assumed by a reflected light is variable and a second subarea provided with a color filter in which incident light is modulated and reflected in a brightness change range within which a brightness of a reflected light is variable. In the light transmission area, the incident light is modulated in a brightness change range within which a brightness of a transmitted light is variable. The light source is periodically switched at least between two lights different in color. The apparatus can perform the modulation in the light transmission area in synchronism with the switching in color of the light source.

13 Claims, 12 Drawing Sheets

U.S. PATENT DOCUMENTS

| | | |
|---|---|---|
| 7,055,968 B2 | 6/2006 | Asao .......................... 353/98 |
| 2004/0021807 A1* | 2/2004 | Narutaki et al. ............ 349/106 |
| 2006/0017750 A1 | 1/2006 | Asao .......................... 345/690 |
| 2006/0055713 A1* | 3/2006 | Asao et al. ................. 345/690 |
| 2007/0063925 A1* | 3/2007 | Yoshihara et al. ............. 345/4 |

FOREIGN PATENT DOCUMENTS

WO    WO 2004/042687    5/2004

* cited by examiner

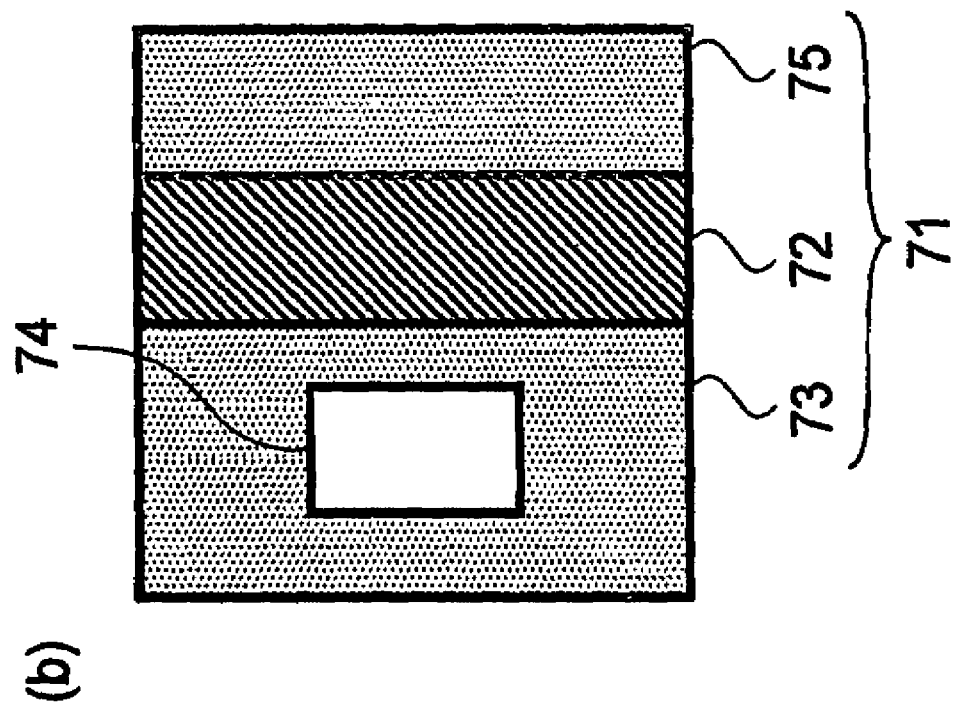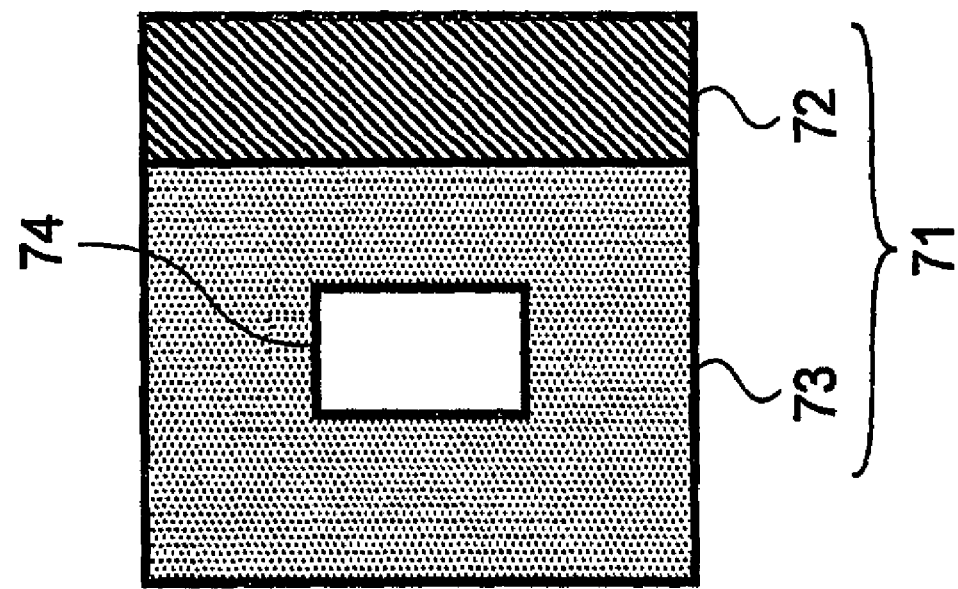
FIG. 3

COLOR DISPLAY APPARATUS

TECHNICAL FIELD

The present invention relates to a color display apparatus capable of effecting multi-color display and a driving method of the color display apparatus.

BACKGROUND OF THE INVENTION

At present, a flat-panel display has widely been popularized as various monitors for a personal computer and the like and as a display device for a cellular phone, and so on. In the future, the flat-panel display is expected to follow popularization more and more, such as development in use for big-screen television.

A most popular flat-panel display is a liquid crystal display. As a color display method for the liquid crystal display, one called a micro-color filter method has been used widely.

Further, in recent years, some display devices, other than the liquid crystal display, excellent in viewability have been reported as an electronic paper display. Most of these devices are intended to realize bright display without using a polarization plate. However, even in such display devices, bright display is realized with respect to monochromatic display but with respect to color display, they are required to employ micro-color filter of three primary colors of red (R), green (G) and blue (B), similarly as in the liquid crystal display. As a result, in the present circumstances, the color display has not been realized as yet with a brightness comparable to that of paper.

The micro-color filter method effects full-color display by constituting one unit pixel with at least three pixels and providing the three pixels with color filters of three primary colors of red (R), green (G), and blue (B), respectively, thus having an advantage of readily realizing a high color-reproducing performance.

On the other hand, as a disadvantage of the micro-color filter method, a transmittance is ⅓ of a monochromatic display method, so that a light utilization efficiency is low.

This low light utilization efficiency leads to a high power consumption of a back light or a front light in a transmission-type liquid crystal display apparatus having the back light or a reflection-type liquid crystal display apparatus having the front light.

As a method in place of the micro-color filter method, U.S. Pat. No. 6,154,191 has proposed a full-color display method (field-sequential color (FSC) method) wherein a time-division color mixing effect by switching images of the three primary colors at high speed is utilized. The FSC method is not required to be provided with a color filter, so that it has the advantages of a low cost and a high light utilisation efficiency. However, the FSC method requires drive of a display device at very high speed, thus exerting a large load on a drive system. As a result, an applicable display mode is limited, so that it cannot be said that the FSC method is currently popularized sufficiently.

Incidentally, in recent years, such a transflective (semi-temperature)-type liquid crystal display apparatus (display device) that a part of an area of a display device is used as a light reflection area and another part of the area is used as a light transmission area has been widely employed in a cellular phase or a mobile data terminal. Particularly, a portable electronic apparatus is required to ensure not only a sufficient viewability in very bright eternal light because it is frequently used outdoors but also a high contrast and a good color reproducibility in a dark room. In order to meet the requirements, a transflective-type liquid crystal display has been proposed in U.S. Pat. No. 6,466,280 as a transflective-type display apparatus which is considered to meet the requirements.

The above described FSC method has been conventionally proposed in a transmission- or reflection-type display apparatus but in the future, it is desired to be applied to the above mentioned transflective display apparatus. Particularly, the FSC method capable of effecting color display both in the reflection mode and the transmission mode is useful for a display of a low-cost potable apparatus.

As described above, the transflective liquid crystal display apparatus has many advantages and has been widely used but, as described more specifically later, is required to give a cell thickness difference of two times between the light transmission area and the light reflection area, thus being accompanied with such a problem that a process load for giving the cell thickness difference within the display device. Further, the transflective-type display apparatus and has a poor light utilization efficiency compared with the transmission-type display apparatus. Accordingly, the transflective-type display apparatus is required to be improved in light utilization efficiency both in the light reflection area and the light transmission area.

SUMMARY OF THE INVENTION

An object of the present invention is to provide a color display apparatus of a transflective-type improved in light utilization efficiency compared with a conventional color display apparatus.

Another object of the present invention is to provide a color display apparatus to which the FSC method is applied.

According to an aspect of the present invention, there is provided a color display apparatus, comprising: a display panel which has light reflection area and a light transmission area for each pixel and a light source for causing light to enter said display panel from a back surface of said display panel, wherein the light reflection area comprises a plurality of subareas including a first subarea in which the incident light is modulated and reflected in a brightness change range within which a brightness of a reflected light is variable and a hue change range within which a hue of a chromatic color assumed by a reflected light is variable and a second subarea provided with a color filter in which incident light is modulated and reflected in a brightness change range within which a brightness of a reflected light is variable, wherein in the light transmission area, the incident light is modulated in a brightness change range within which a brightness of a transmitted light is variable, wherein said light source is periodically switched at least between two lights different in color, and wherein said apparatus further comprises means for performing the modulation in the light transmission area in synchronism with the switching in color of said light source.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3(a) and 3(b) are schematic views each showing a pixel structure of a liquid crystal display device used in Example 1 of the present invention.

BEST MODE FOR CARRYING OUT THE INVENTION

The present invention is applicable to color display apparatuses using various media. However, in the following description, a color liquid crystal display apparatus utilizing an electrically controlled birefringence (ECB) effect.

The ECB-type color liquid crystal display apparatus colors light by utilizing a birefringence action of liquid crystal and a polarization action of a polarization plate.

Figure 1:
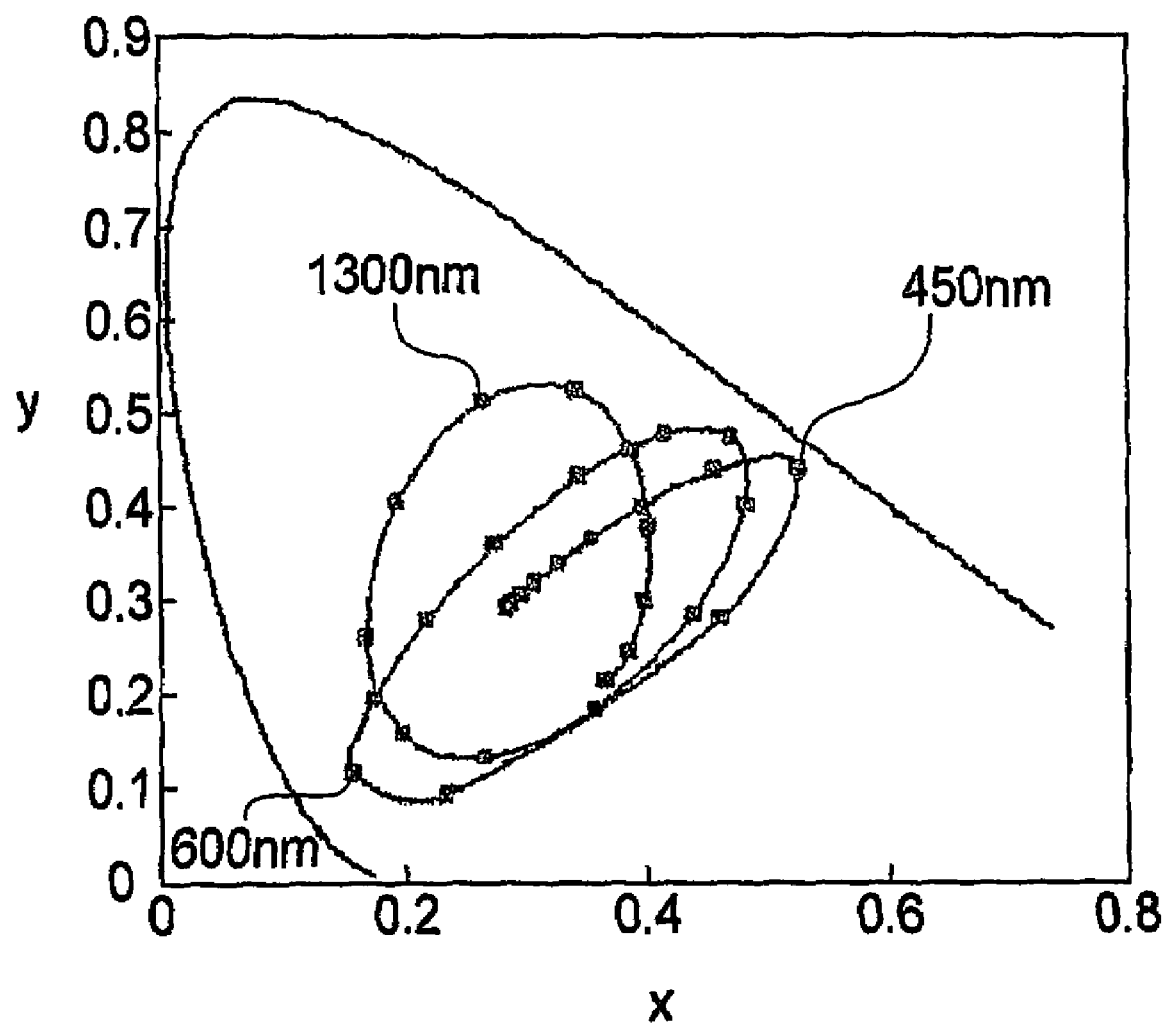
FIG. 1 is a chromaticity diagram showing a change in chromaticity with a change in retardation.

FIG. 1 is a chromaticity diagram showing a relationship between an amount of birefringence (called retardation R) of the ECB-type display device and coordinates. From FIG. 1, it is found that the color at a retardation R from 0 to about 250 nm is achromatic color since the retardation range is located substantially at a center portion of the chromaticity diagram but is changed when the retardation exceeds the retardation range.

When a liquid crystal material having a negative dielectric anisotropy (−Δ∈) is used as the liquid crystal and liquid crystal molecules thereof are homeotropically (vertically) aligned with respect to the substrates, the liquid crystal molecules are inclined with voltage, so that an amount of birefringence (retardation) is increased with a degree of the inclination of the liquid crystal molecules.

In this case, in a cross-nicol condition, the chromaticity is changed along a curve indicated in FIG. 1. When the voltage is not applied, the retardation R is substantially zero, so that light does not pass through the display device to provide a dark (black) state. With an increase in voltage, brightness is increased in the order of black, gray, and white. When the voltage is further increased, the light is colored to change the color in the order of yellow, red, violet, blue, yellow, violet, light blue, and green.

As described above, under voltage application, the ECB-type display apparatus is capable of changing the brightness between a maximum brightness and a minimum brightness in a modulation range on a low voltage side under and changing a plurality of hues.

Hereinbelow, the range of retardation (0 to about 250 nm) in which the brightness is changed in the order of black, gray, and white on the chromaticity diagram is referred to as a "brightness change range", and a range of retardation (not less than 250 nm) in which chromatic color not less than yellow is changed is referred to as a "hue change range". However, a border between the achromatic color and the chromatic color is not determined clearly, so that the border of 250 nm should be understood as a certain index thereof.

Incidentally, in the present invention, the color obtained by retardation (retardation change) is referred to but it means the color along the curve shown in FIG. 1. On the curve, three points at which the purity is maximum are located close to positions where the retardation is 450 nm, 600 nm and 1300 nm, and the color is visually recognized as red, green, and blue, respectively. However, before and after each of the three points, there is a 100 nm-range in which the color is substantially regarded as the corresponding color (red, green or blue), so that in the present invention, the colors in such ranges are also referred to as red, green and blue, respectively. Magenta is located at a point of 530 nm between the ranges of red and blue.

Generally, the color of color filter used in the liquid crystal display apparatus has a higher purity than that obtained by retardation, so that it is located outside the above described chromaticity distribution on the chromaticity diagram shown in FIG. 1. In the present invention, however, such color is also referred to as the same color.

(Display Mode in Reflection Area)

In the transflective-type display apparatus of the present invention, as a display mode in the reflection area, a color display mode proposed by the inventor and described in International Publication No. WO2004-042687 A2 is used.

FIG. 2(a) is a simplest constitution of the color display mode.

Figure 2:
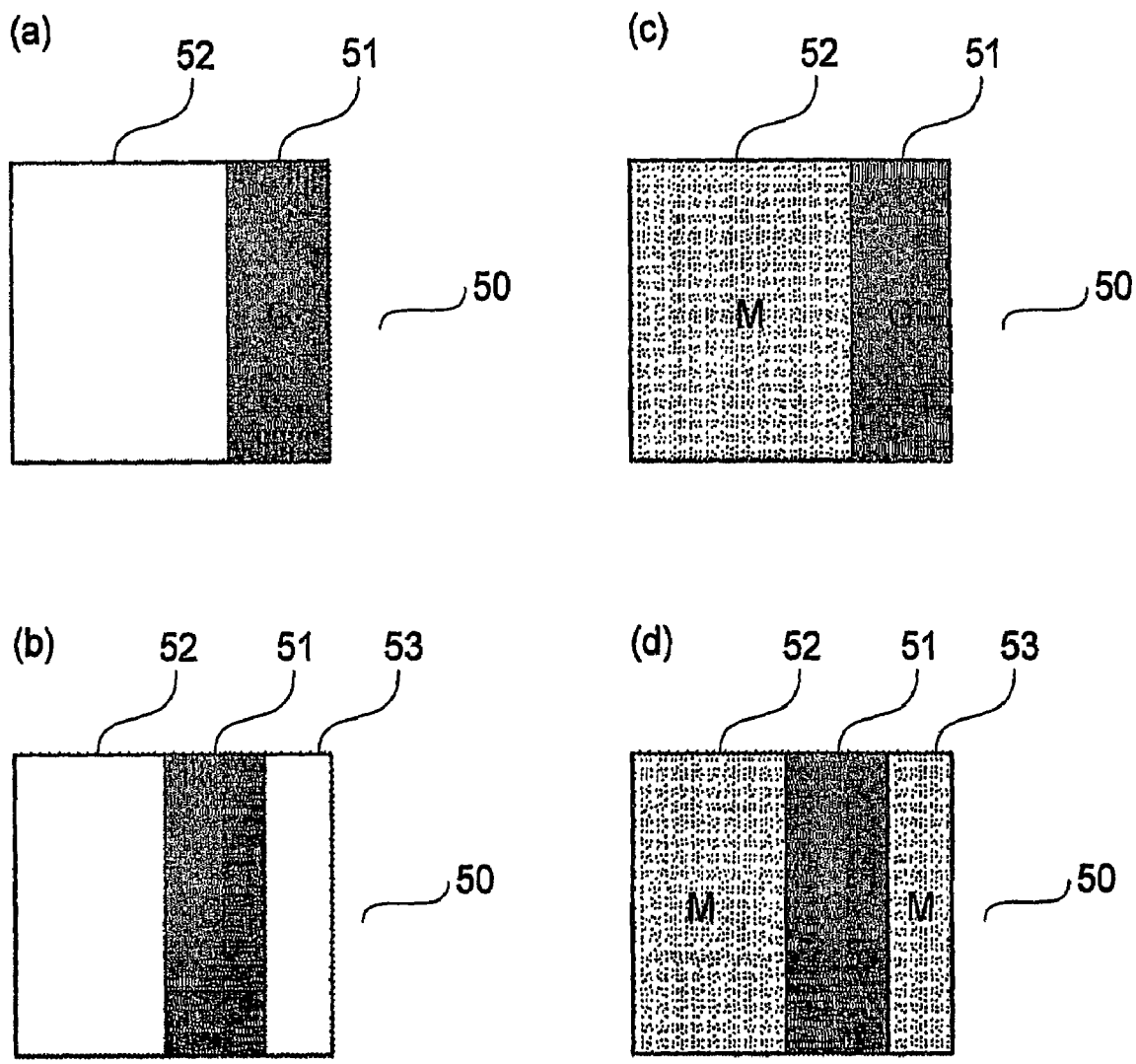
FIGS. 2(a) to 2(d) are explanatory views of pixel constitution in a reflection display mode.

Referring to FIG. 2(a), one pixel 50 is divided into a plurality of subpixels (two subpixels in this case) 51 and 52, and one subpixel 51 is provided with a green color filter G and supplied with a voltage in a low retardation area in FIG. 2. At the remaining subpixel 52 provided with no color filter, by adjusting a retardation in a wide voltage range than that at the subpixel 52, a change in luminance from black to white and display of any color, of interference colors based on the ECB effect, from red to blue through green are achieved. As described above, in the color display mode (WO2004-042687 A2), a unit pixel is constituted by a first subpixel 51 at which the color filter is provided and the color of the color filter is displayed by changing the retardation in a brightness change range through voltage and a second subpixel 52 at which chromatic color is displayed by changing the retardation of the liquid crystal layer under voltage application. At the subpixel 51 for displaying green having a high luminosity factor, the green color filter G is used without utilizing an ECB effect-based coloring phenomenon. Further, the ECB effect-based coloring phenomenon is utilized for only red and blue.

The green (G) subpixel 51 provided with the green color filter is placed in the dark state and a transparent subpixel 52 provided with no color filter is placed in the white (bright) state (a maximum luminance state in a change area of achromatic color), whereby it is possible to display white at the pixel as a whole.

Alternatively, it is also possible to place the G subpixel 51 in a maximum transmission state and place the transparent subpixel 52 in a magenta (display) state in the chromatic color area. The magenta includes both red (R) and blue (B), so that it is possible to attain white display as the result of color composition.

In order to provide the single color of green (G), the G subpixel 51 is placed in the maximum transmission state and the transparent subpixel 52 is placed in the dark state. In order to provide the single color of red (R) (or blue (B)), the G subpixel 52 is placed in the dark state and the transparent pixel is adjusted to provide a retardation of 450 nm (or 600 nm).

By using the above methods in combination, it is also possible to obtain mixed color of R and G or B and G.

Both at the G subpixel 51 and the transparent subpixel 52, it is possible to effect black display by providing these pixels with a retardation of zero to be placed in the dark state.

With respect to the retardation, at the G subpixel 51, the retardation is changed in the range of 0-250 nm and at the transparent subpixel 52, the retardation is changed both in the range of 0-250 nm and the range of 450-600 nm. At both the subpixels 51 and 52, the liquid crystal material is ordinarily used in common, so that a drive display range is set to be different between the sub-pixels.

In the liquid crystal display device shown in FIG. 2(*a*), with respect to green, it is possible to effect continuous gradation display but at the transparent subpixel, the chromatic color states, i.e., blue and red, utilize the ECB-based coloring phenomenon, thus failing to effect gradation display.

Figure 5:
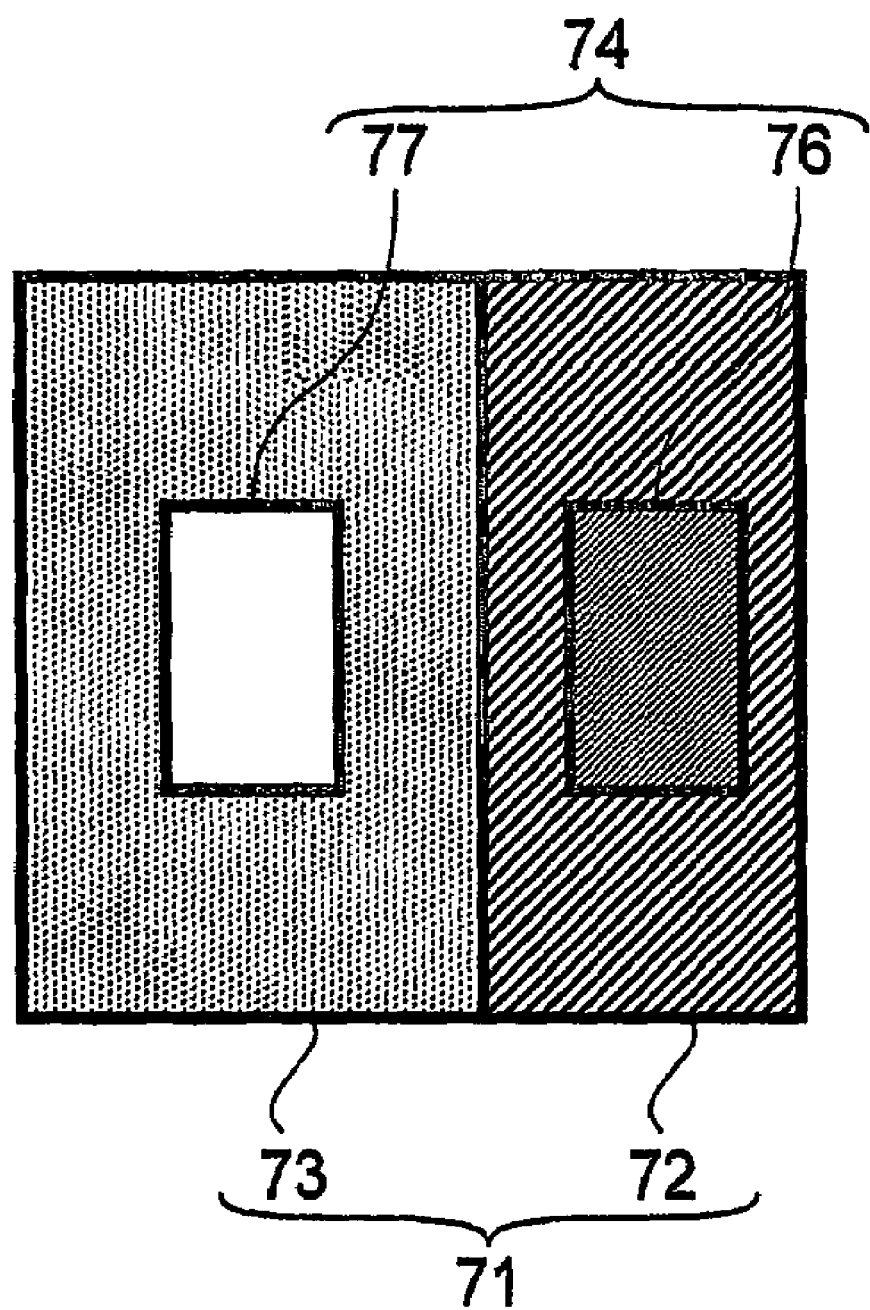
FIG. 5 is a schematic view showing a pixel structure of a liquid crystal display device used in Example 2 of the present invention.

FIG. 2(*b*) shows one pixel structure which is improved in gradation characteristic compared with that shown in FIG. 5(*a*), wherein the transparent subpixel (52 of FIG. 2(*a*)) is divided into a plurality (two) of subpixels 52 and 53 at an areal ratio of 2:1, whereby gradation is displayed in a digital manner.

FIGS. 2(*c*) and 2(*d*) show modified embodiments of one pixel structure, wherein a G subpixel 51 is similarly provided in the green color filter and a subpixel 52 is provided with a magenta color filter different from the transparent subpixels 52 shown in FIGS. 2(*a*) and 2(*b*). FIG. 2(*c*) shows the case of one magenta subpixel 52, and FIG. 2(*d*) shows the case where the magenta subpixel is divided two magenta subpixels 52 and 53 at an areal ratio of 2:1 to effect digital gradation display.

(Display Mode in Transmission Area)

Next, a light transmission area in the transflective-type display apparatus according to the present invention will be described.

As described above, in the conventional transflective-type display apparatus (display device), the cell thickness at the transmission portion is two times that at the reflection portion in order to maximize both the light utilization efficiencies at the transmission portion and the reflection portion.

The conventional transflective display apparatus is based on the display principle utilizing coloring by birefringence, so that it requires a large retardation exceeding the brightness change range. As a result, it is necessary to provide a larger cell thickness compared with such a mode that it is sufficient to effect the modulation in the brightness change range as in the three-color filter mode. When the conventional display apparatus is used as the transflective-type display apparatus, the larger cell thickness is given in the reflection area (reflection portion), so that in the transmission area (transmission portion), the cell thickness is required to be two times the larger cell thickness. When the cell thickness is increased, a resultant response speed becomes show and it is necessary to form a thick film in the cell in order to provide the larger cell thickness at the transmission portion than that the reflection portion. As a result, there arises such a problem on the production process, such as uniformity in thickness and photolithography for patterning.

Further, at the reflection portion, digital gradation by pixel area division is adopted but there is a limit to increase in the number of gradation levels. In view of this limit, it is desirable that a gradation display quality is improved by compensating the low gradation of display in the reflection area through realization of high gradation displayability in the transmission area.

In the transflective display panel used in the present invention, the display mode in the reflection area is similar to the conventional display mode but in the transmission area, such a display mode that the low retardation brightness change range is employed and the FSC mode using the time-division color mixture-based full-color display principle is adopted is utilized.

As the FSC mode, it is possible to use any one of the following modes (1) and (2):

(1) a mode in which one subpixel is provided in the transmission area and a brightness modulation is performed in synchronism with switching of a light source for each of the three primary colors, and (2) a mode in which two subpixels is provided in the transmission area, and at one subpixel, a green color filter is provided to effect brightness modulation and at the other subpixel, brightness modulation is effected in synchronism with switching of a light source between red and blue.

The mode (2) may preferably employ the same green color filters at the reflection portion. Further, it is also possible to use a magenta color filter at the subpixel for performing the FSC display of red and blue.

Hereinbelow, these modes (1) and (2) will be described more specifically.

Mode (1)

FIG. 3(*a*) shows a pixel structure in this mode, wherein a reflection area (reflection portion) 71 is constituted, similarly as in the case of FIG. 2(*a*), by two subpixels including a subpixel 72 provided with a green color filter and a subpixel 73 which is transparent. A transmission area (transmission portion) 74 is not provided with a color filter and is constituted by one subpixel. One of the subpixels (73 shown in FIG. 3(*a*)) in the reflection area 71 may be divided into two subpixels 73 and 75 as shown in FIG. 3(*b*), thus performing digital gradation.

Display at the reflection portion 71 is effected by performing modulation in the brightness change range at the green subpixel 72 and modulation over the brightness change range and the hue change range at the transparent subpixel 73 as described above.

Display at the transmission portion 74 is effected by performing modulation in the brightness change range at high speed in synchronism with switching of a light source. Generally, a frame frequency in the reflection area 71 is 60 Hz, so that this period is divided in three portions in the transmission area 74 and an image of each of red, green and blue is formed in a period of $1/180$ sec. The light source performs switching of lights of red, green and blue, whereby color mixing of the three primary colors is effected. By modulating the brightness of each color in a continuous gradation manner, it is possible to effect full-color display.

Figure 4:
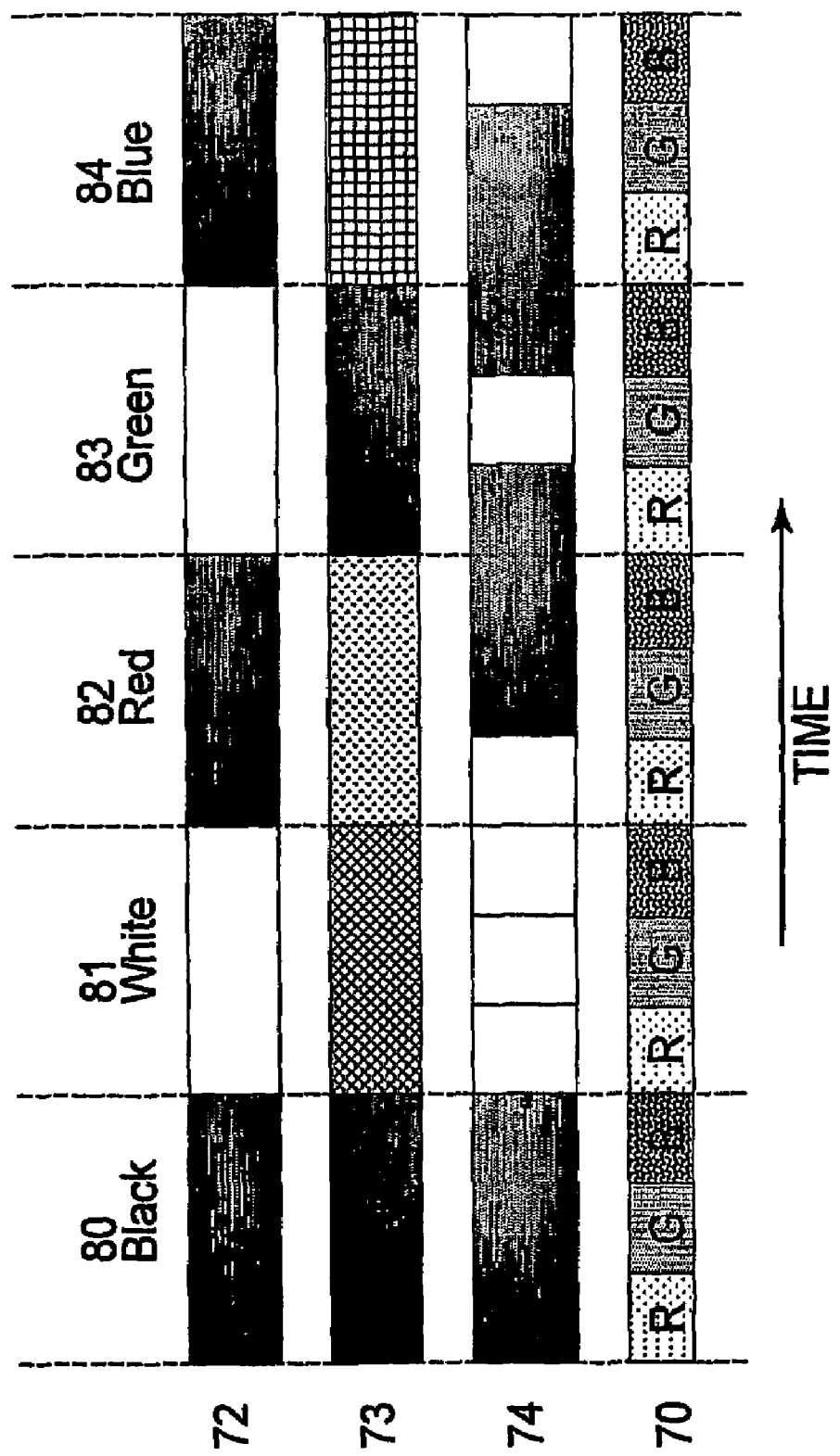
FIG. 4 is a time chart showing a display state and a pixel state of the liquid crystal display device used in Example 1 of the present invention.

FIG. 4 shows lighting colors of a light source 70 and drive states at the respective subpixels 72, 73, and 74 when the display color is changed in the order of black (80), white (81), red (82), green (83) and blue (84) at one pixel shown in FIG. 3. The light source 70 is switched every one period consisting of three portions of red (R), green (G), and blue (B), and in synchronism therewith, the transmission portion 74 is placed at a frequency of 180 Hz in either one of an ON state (indicated by white portion) and an OFF-state (indicated by gray portion). The green subpixel 72 and the transparent subpixel 73 at the reflection portion 71 are switched at a frequency of 60 Hz.

A black display state 80 is a light blocking state in which both of the reflection portion 71 including the two subpixels 72 and 73 and the transmission portion 74 are placed in the OFF states.

In a white display state 81, the green subpixel 72 at the reflection portion 71 is placed in the ON state, the transparent subpixel 73 is supplied with a voltage for displaying an intermediary state of magenta between red and blue, and the transmission portion 74 is placed in the ON state. It is also possible to display white by placing the green subpixel 72 at the reflection portion 71 in the OFF state and providing a maximum brightness in the brightness change range at the transparent subpixel 73.

In a red display state 82, the green subpixel 72 at the reflection portion 71 is placed in the OFF state, the transparent subpixel 73 is supplied with a voltage for reflecting red light, and the transmission portion 74 is placed in the ON state at a timing when the light source 70 emits red light and is placed in the OFF state at other timing.

In a green display state 83, the green subpixel 72 at the reflection portion 71 is placed in the OFF state, the transparent subpixel 73 is supplied with a voltage for reflecting blue light, and the transmission portion 74 is placed in the ON state at a timing when the light source 70 emits blue light and is placed in the OFF state emits blue light and is placed in the OFF state at other timings.

In a blue display state 84, the green subpixel 72 at the reflection portion 71 is placed in the OFF state, the transparent subpixel 73 is supplied with a voltage for reflecting blue light, and the transmission portion 74 is placed in the ON state at a timing when the light source 70 emits blue light and is placed in the OFF state at other timing.

Each of the green subpixel 72 and the transmission portion 74 can also be placed in an intermediary ON state, so that it is possible to effect display of gray or display of green at an intermediary brightness. Further, in the pixel structure shown in FIG. 3(b), it is also possible to perform digital gradation display of red, blue and their intermediary colors.

The transmission portion 74 and the reflection portion 71 are driven at the same time to be used for display but with respect to display in such a dark place that there is no lighting mixture in its surroundings, it is possible to apply a voltage to only the transmission portion 74. In such equipment that only one of the transmission portion 74 and the reflection portion 71 is always operated, it is possible to constitute the electrode(s) and the drive circuit in common, so that a circuit and wiring are simplified. In the pixel structure shown in FIG. 3(a), a common electrode can be provided at the transmission portion 74 and the green subpixel 72 at the reflection portion 71 and a TFT and its wiring as the drive circuit can also be used as a common (single) element.

Incidentally, in the case where a non-holding display is effected by interposing a black picture area between those of red, green and blue or in order to prevent a color breakup phenomenon during motion picture display, it is preferable that image formation is effected at a higher speed than 1.180 sec.

Mode (2)

FIG. 5 shows a pixel structure in this mode, wherein a reflection area (reflection portion) 71 is constituted, similarly as in the case of FIG. 3(a), by two subpixels including a green subpixel 72 and a transparent subpixel 73. A transmission area (transmission portion) 74 is divided into the subpixels 76 and 77 having the same area. One subpixel 76 is provided with a green color filter and the other subpixel 77 is transparent similarly as in the case of the subpixels 72 and 73.

Display at the reflection portion 71 is effected by performing modulation in the brightness change range at the green subpixel 72 and modulation over the brightness change range and the hue change range at the transparent subpixel 73 similarly as in the mode (1).

The light source performs switching of lights of red, green and blue, similarly as in the case of the mode (1).

Display at the transmission portion 74 is effected by performing modulation in the brightness change range independently at the subpixels 76 and 77 and a display image at the subpixel 77 is switched at high speed in synchronism with switching of the light source. In this case, when the light source emits red light, a modulation in luminance corresponding to a red image is performed and when the light source emits blue light, a modulation in luminance corresponding to a blue image is performed. However, when the light source emits green light, the transmission portion 74 is placed in a black display state so as not to permit transmission of the green light.

Figure 6:
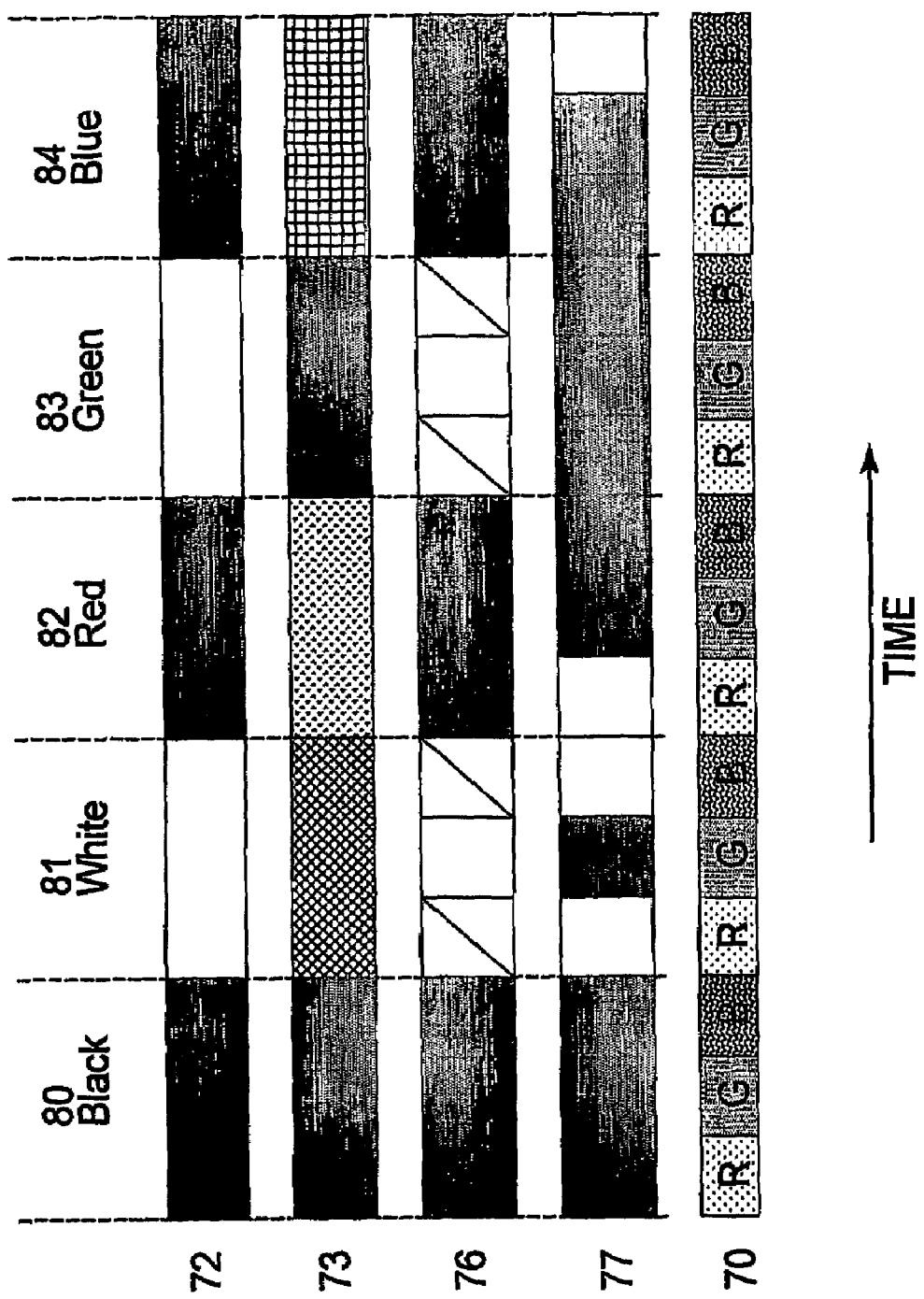
FIG. 6 is a time chart showing a display state and a pixel state of the liquid crystal display device used in Example 2 of the present invention.

FIG. 6 shows lighting colors of a light source 70 and drive states at the respective subpixels 72, 73, 76 and 77 when the display color is changed in the order of black (80), white (81), red (82), green (83) and blue (84) at one pixel shown in FIG. 5.

A black display state 80 is a light blocking state in which both of the reflection portion 71 including the two subpixels 72 and 73 and the transmission portion 74 including the two subpixels 76 and 77 are placed in the OFF states.

In a white display state 81, the green subpixel 72 at the reflection portion 71 is placed in the ON state, the transparent subpixel 73 is supplied with a voltage for displaying an intermediary state of magenta between red and blue, the transmission portion 74 is placed in the ON state, and the transparent subpixel 77 is placed in the ON state when the light source emits red light or blue light but is placed in the OFF state when the light source emits the green light. It is also possible to display white by placing the green subpixel 72 at the reflection portion 71 in the OFF state and providing a maximum brightness in the brightness change range at the transparent subpixel 73.

The green subpixel 76 at the transmission portion 74 is placed in the ON state when the light source 70 emits not only the green light but also the red light and the blue light. In an actual display, however, the light is absorbed by the green color filter at the timings for red and blue to prevent light transmission as indicated by a slashed box in FIG. 6, thus providing a black display state.

In a red display state 82, the green subpixel 72 at the reflection portion 71 is placed in the OFF state, the transparent subpixel 73 is supplied with a voltage for reflecting red light, the green subpixel 76 at the transmission portion 74 is placed in the OFF state, and the transparent subpixel 77 at the transmission portion 74 is placed in the ON state at a timing when the light source 70 emits red light and is placed in the OFF state at other timing.

In a green display state 83, the green subpixel 72 at the reflection portion 71 is placed in the OFF state, the transparent subpixel 73 is supplied with a voltage for reflecting blue light, the green subpixel 76 at the transmission portion 74 is placed in the ON state, and the transparent subpixel 77 at the transmission portion 74 is placed in the OFF state. The green subpixel 76 is also placed in the ON state when the light source emits the red light and the blue light. However, in an actual display, the light is absorbed by the green color filter to prevent light transmission, thus providing a black display state.

In a blue display state 84, the green subpixel 72 at the reflection portion 71 is placed in the OFF state, the transparent subpixel 73 is supplied with a voltage for reflecting blue light, the green subpixel 76 at the transmission portion 74 is placed in the OFF state, and the transparent subpixel 77 at the transmission portion 74 is placed in the ON state at a timing when the light source 70 emits blue light and is placed in the OFF state at other timings.

At the transmission portion 74, the two subpixels 76 and 77 are disposed at an areal ratio of 1:1, so that an amount of light when a single color of R, G or B is displayed is proportional to an amount of light of an associated color light emitted from the light source. Accordingly, by using a white light source on the basis of color mixing of the primary three colors (RGB), a color balance of display color is kept as it is.

In the case of such equipment that display in the reflection mode and display in the transmission mode are not effected at the same time, the electrodes and the TFTs at the reflection portion and the transmission portion may be colored to a common electrode and a common TFT. In the case of the pixel structure shown in FIG. 5, the common electrode is provided at both the subpixels 72 and 76. Similarly, when the subpixels 73 and 77 is provided with the common electrode, a common drive circuit is also provided conveniently.

Figure 7:
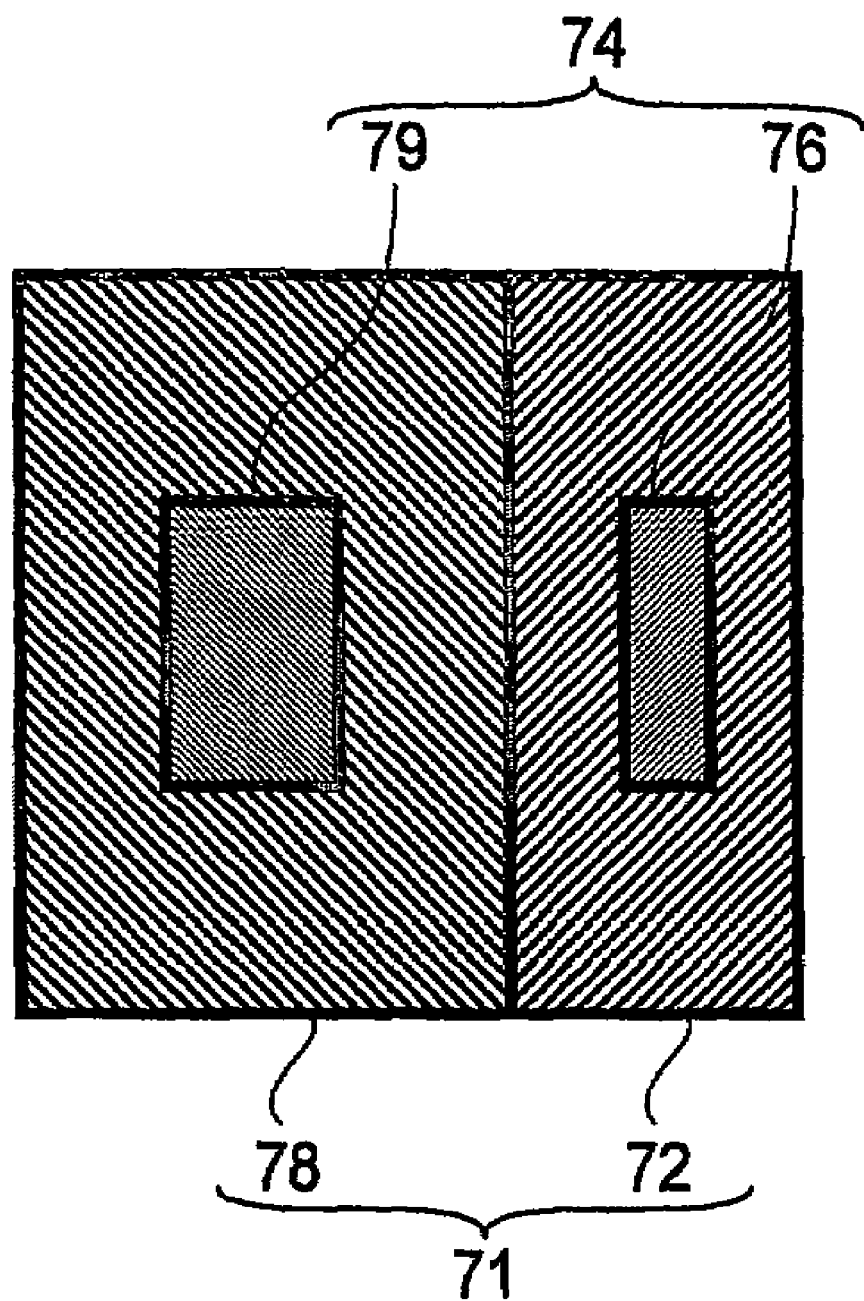
FIG. 7 is a schematic view showing a pixel structure of a liquid crystal display device used in Example 3 of the present invention.

FIG. 7 shows a modified embodiment of the case of the mode (2), wherein a reflection area (reflection portion) 71 is divided into two subpixels including a green subpixel 72 and a subpixel 78 is divided into two subpixels including a subpixel 76 provided with a green color filter and a subpixel 79 provided with a magenta color filter.

Figure 8:
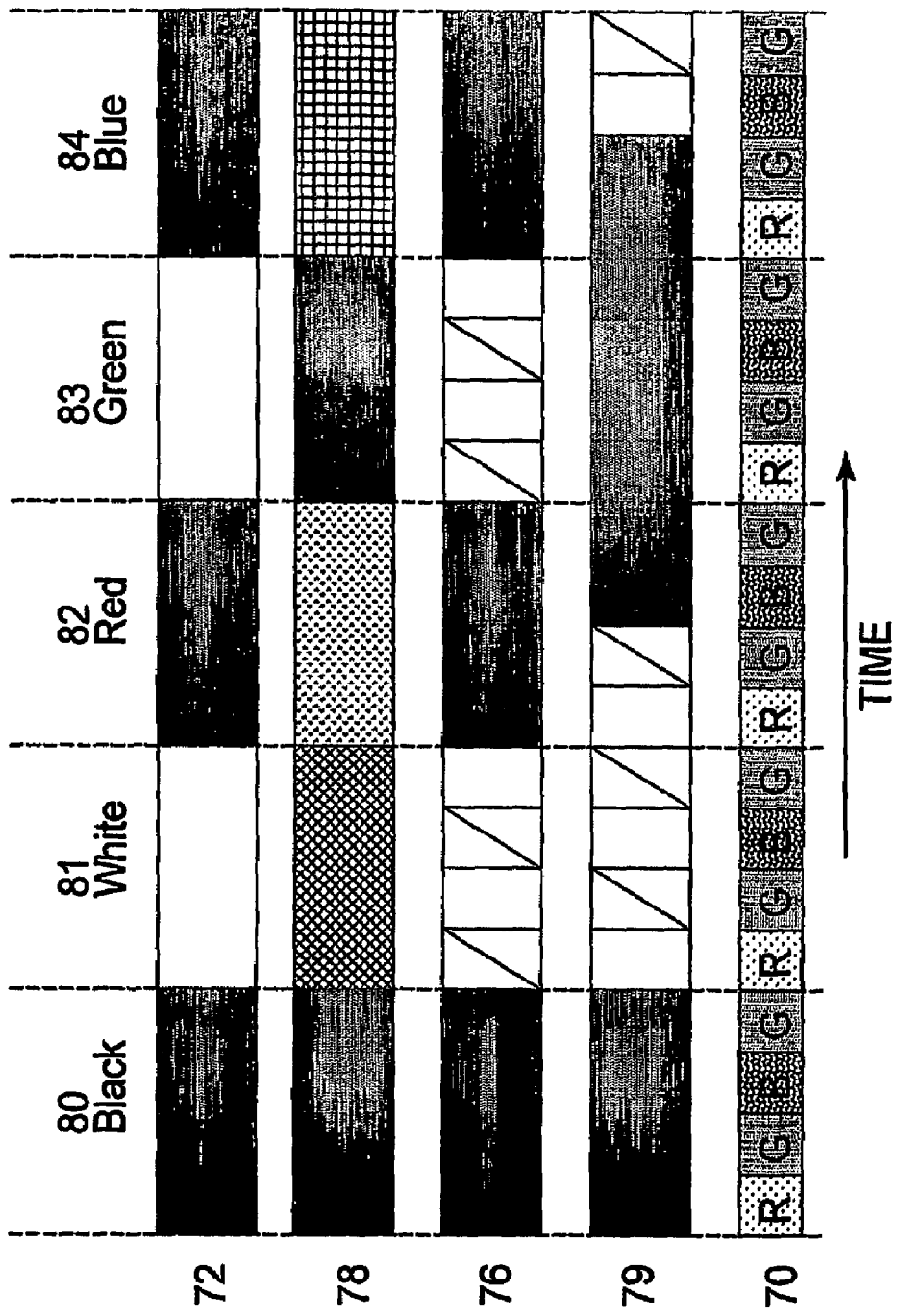
FIG. 8 is a time chart showing a display state and a pixel state of the liquid crystal display device used in Example 3 of the present invention.

FIG. 8 shows lighting colors of a light source 70 and drive states at the respective subpixels 72, 78, 76 and 79 when the display color is changed in the order of black (80), white (81), red (82), green (83) and blue (84) at one pixel shown in FIG. 7.

The light source 70 is switched every one period consisting of four portions of red (R), green (G), blue (B), and green (G). When a frame frequency is 60 Hz, an illumination period of one color is 1/240 sec.

A black display state 80 is a light blocking state in which all the four subpixels including the two subpixels 72 and 78 at the reflection portion 71 and the two subpixels 76 and 79 at the transmission portion 74 are placed in the OFF state.

In a white display state 81, the green subpixel 72 is placed in the ON state, the magenta subpixel 78 is supplied with a voltage for displaying an intermediary color of magenta between red and blue, and both the green subpixel 76 and the magenta subpixel 79 at the transmission portion 74 are placed in the ON state. It is also possible to place the magenta subpixel 78 at the reflection portion 71 is placed in a maximum brightness state. The green subpixel 76 at the transmission portion 74 is placed in the ON state when the light source 70 emits not only green light but also red light and blue light. However, in an actual display, the light is absorbed by the green color filter, so that the light does not pass through the color filter at the timings for red and blue. Further, the magenta subpixel 79 at the transmission portion 74 is placed in the ON state irrespective of the switching of the light source 70. However, in an actual display, the green light is absorbed by the magenta color filter, so that the red light and the blue light passes through the color filter at an associated timing for red light or blue light emitted from the light source but the green light does not pass through the color filter at the timing therefor. In FIG. 8, a slashed box represents such a timing that the subpixel is placed in the ON state but an associated color light does not pass through the color filter to provide a black display state.

In a red display state 82, the green subpixel 72 at the reflection portion 71 is placed in the OFF state and the magenta subpixel 78 is supplied with a voltage for reflecting red light, so that the red light passes through the magenta color filter to display red. At the transmission portion 74, the green subpixel 76 is placed in the OFF state, and the magenta subpixel 79 is placed in the ON state at a timing when the light source 70 emits red light and subsequent green light but is placed in the OFF state at other timings. Even when the magenta subpixel 79 is placed in the ON state at the timing when the light source 70 emits the green light, the green light is absorbed and blocked by the magenta color filter, so that only the red light passes through the color filter.

In a green display state 83, the green subpixel 72 at the reflection portion is placed in the ON state and the magenta subpixel 78 is placed in the OFF state. At the transmission portion 74, the green subpixel 76 is placed in the ON state and the magenta subpixel 79 is placed in the OFF state. The green subpixel 76 is placed in the ON state even when the light source emits red light and the blue light. However, in an actual display, the light is absorbed by the green color filter, so that the light does not pass through the color filter at the timing.

In a blue display state 84, the green subpixel 72 at the reflection portion 71 is placed in the OFF state and the magenta subpixel 78 is supplied with a voltage for reflecting blue light. At the transmission portion 74, the green subpixel 76 is placed in the OFF state, and the magenta subpixel 79 is placed in the ON state at a timing when the light source emits blue light and subsequent green light but is placed in the OFF state at other timings.

At the green subpixel 76 at the transmission portion 74, a luminance state corresponding to an identical green image is kept for one period irrespective of the switching of the light source and modulation is performed at a frequency of 60 Hz. At the magenta subpixel 79 at the transmission portion 74, the luminance state is switched to a luminance state corresponding to red light or blue light at a frequency of 120 Hz which is ½ of the frequency of the light source switching. In this constitution, the frequency of the light source switching is increased but the frequency of pixel modulation is 120 Hz at the maximum, so that the liquid crystal material can be used even at a relatively slow response speed.

In the pixel structure shown in FIG. 7, when the cell is driven in the manner shown in FIG. 8 by switching the light source at a frequency of 240 Hz, a balance of white of the light source is kept at it is in the case where the two subpixels 76 and 79 at the transmission portion 74 have an areal ratio of 1:2.

In the case of such equipment that display in the reflection mode and display in the transmission mode are effected at the same time, similarly as in the case of the pixel structure shown in FIG. 5, it is possible to use a common electrode and a common TFT at both the reflection portion and the transmission portion.

A second modified embodiment of the case of the mode (2) will be described. The structure of unit pixel is the same as in the above described modified embodiment of the case of the mode (2), i.e., as shown in FIG. 7.

Figure 12:
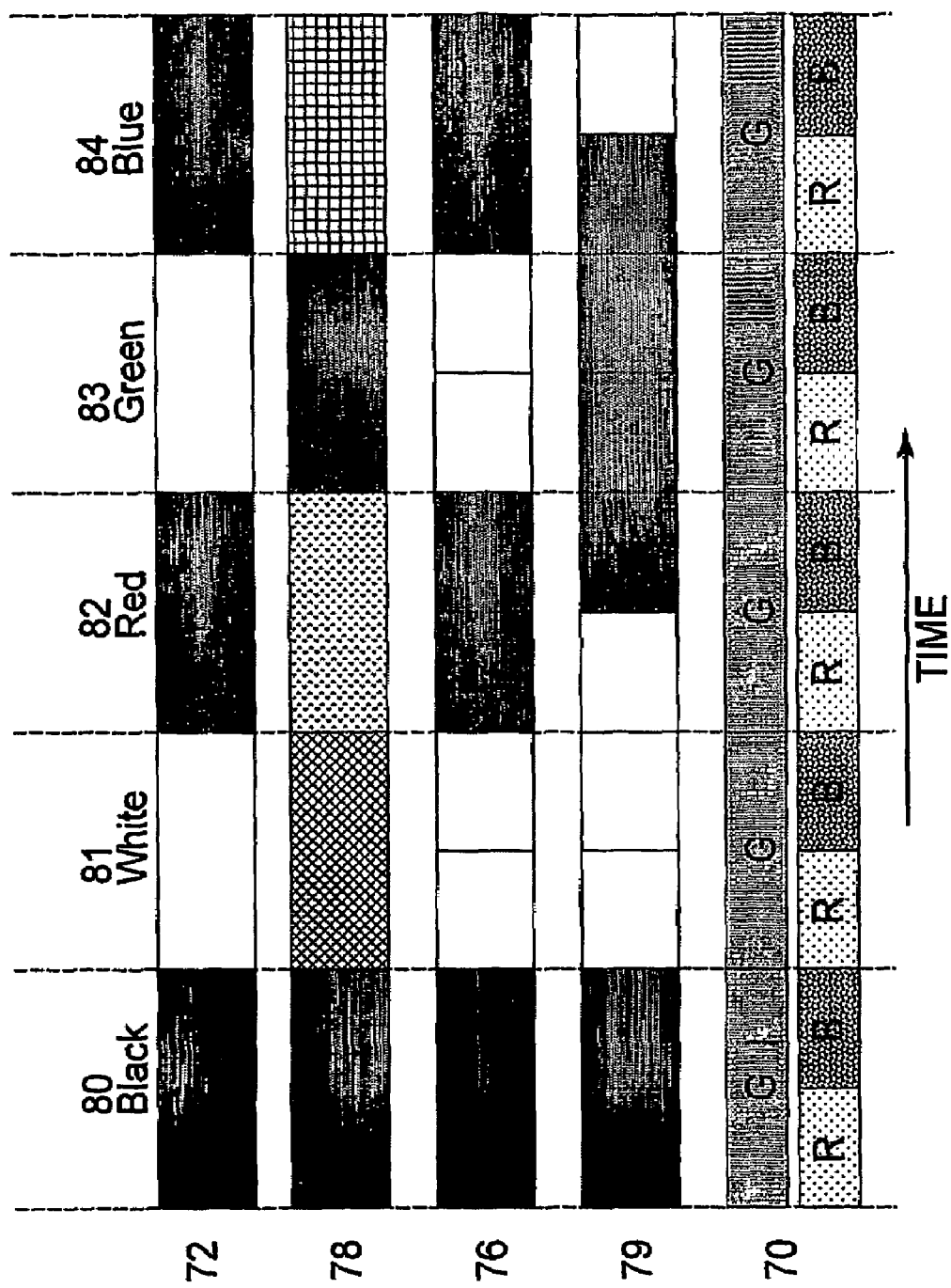
FIG. 12 is a time chart showing a display state and a pixel state of a liquid crystal display device used in Example 4 of the present invention.

FIG. 12 shows lighting colors of a light source 70 and drive states at the respective subpixels 72, 78, 76 and 79 when the display color is changed in the order of black (80), white (81), red (82), green (83) and blue (84) at one pixel shown in FIG. 7.

As the light source, an integral unit of three light sources of red (R), green (G) and blue (B) capable of being independently turned on is used. The green light source is always turned on. The red light source and the blue light source are periodically switched. More specifically, two periods including a period in which light emission of yellow is performed by turning on the green light source and the red light source at the same time and a period in which light emission of cyan is performed by turning on the green light source and the blue light source at the same time are switched as one frame period. When a frame frequency is 60 Hz, an illumination period of one color is $\frac{1}{20}$ sec.

A black display state 80 is a light blocking state in which all the four subpixels including the two subpixels 72 and 78 at the reflection portion 71 and the two subpixels 76 and 79 at the transmission portion 74 are placed in the OFF state.

In a white display state 81, the green subpixel 72 is placed in the ON state, the magenta subpixel 78 is supplied with a voltage for displaying an intermediary color of magenta between red and blue. It is also possible to place the magenta subpixel 78 at the reflection portion 71 is placed in a maximum brightness state in the brightness change range. As for white display at the transmission portion 74, both of the green subpixel 76 and the magenta subpixel 79 are placed in the ON state.

In a red display state 82, the green subpixel 72 at the reflection portion 71 is placed in the OFF state and the magenta subpixel 78 is supplied with a voltage for reflecting red light, so that the red light passes through the magenta color filter to display red. At the transmission portion 74, the green subpixel 76 is placed in the OFF state, and the magenta subpixel 79 is placed in the ON state at a timing when the light source 70 emits red light but is placed in the OFF state at other (remaining) timing. Although the green light source is always turned on, the green light is absorbed by the magenta color filter, so that the light from the green light source does not passes through the color filter.

In a green display state 83, the green subpixel 72 at the reflection portion is placed in the ON state and the magenta subpixel 78 is supplied with a voltage for reflecting the blue light. At the transmission portion 74, the green subpixel 76 is placed in the ON state and the magenta subpixel 79 is placed in the OFF state. The green light source is turned on, so that the green light passes through the green subpixel 76. The red light and the blue light are absorbed by the green color filter, so that they do not pass through the green subpixel 76.

In a blue display state 84, the green subpixel 72 at the reflection portion 71 is placed in the OFF state and the magenta subpixel 78 is supplied with a voltage for reflecting blue light, so that the blue light passes through the magenta color filter to pixel blue. At the transmission portion 74, the green subpixel 76 is placed in the OFF state, and the magenta subpixel 79 is placed in the ON state at a timing when the light source emits blue light but is placed in the OFF state at the other timing. Although the green light source is always turned on, the green light is absorbed by the magenta color filter, so that the green light does not pass through the magenta subpixel 79.

As described above, at the green subpixel 76 at the transmission portion 74, a luminance state corresponding to an identical green image is kept for one frame period of the light source and modulation is performed at a frequency of 60 Hz. At the magenta subpixel 79 at the transmission portion 74, the luminance state is switched to a luminance state corresponding to red light or blue light at a frequency of 120 Hz which is $\frac{1}{2}$ of the frequency of the light source switching. In this constitution, the green light source is always placed in a lighting state, so that a high luminance light source can be used as the green light source. With respect to red and blue, the frequency of pixel modulation is 120 Hz at the maximum, so that the liquid crystal material can be used even at a relatively slow response speed. It is not necessary to switch the color light sources at high speed, so that it becomes possible to select a high-efficiency light source, such as a cold-cathode(-ray) tube, a hot-cathode tube, a halogen lamp, etc.

In the pixel structure shown in FIG. 7, when the display apparatus is driven in the manner shown in FIG. 12, a balance of white of the light source is kept as it is at an areal ratio, between the two subpixels 76 and 79 at the transmission portion 74, of 1:2.

With respect to the red image, about 60 Hz which is flickering recognition frequency is divided into at least two portions so as to form a blue display image at the former $\frac{1}{120}$ sec and a red display image at the latter $\frac{1}{120}$ sec. In the conventional FSC mode, an image is required to be formed at least at $\frac{1}{180}$ sec, so that it is necessary to apply ultrahigh-speed display mode. However, in the display mode in the present invention, a constraint on the response speed is somewhat alleviated.

Further, in the above described display mode in the present invention, by interposing a black display period in one frame period, it is possible to effect a non-holding-type display which effects such a display that a lighting state and a non-lighting state are repeated. As a result, it becomes possible to realize a good motion picture performance.

In the case of such equipment that display in the reflection mode and display in the transmission mode are effected at the same time, similarly as in the case of the pixel structure shown in FIG. 5, it is possible to use a common electrode and a common TFT at both the reflection portion and the transmission portion.

As described in the modes (1) and (2), by switching the color of light emitted from the light source to effect time-division color display, in the transmission area (transmission portion), the color filter is not disposed or the color filter disposed in the reflection area (reflection portion) is used in common. For this reason, it is not necessary to add a new color filter for only the transmission area. Accordingly, such a constitution is particularly suitable for the color display mode in the present invention from the viewpoint of not impairing an advantage of a simple color filter constitution in the reflection area.

Further, with respect to the liquid crystal material, it is sufficient to perform modulation only in the brightness change change, not in the hue change range requiring the high retardation, so that the cell thickness in the transmission portion is not required to be increased. This is also convenient for the color display mode in the present invention in which the cell thickness in the reflection area is somewhat larger than that in the transmission area.

Incidentally, in the above described mode (2), in the case where the color filter used at the reflection portion is not the green color filter (and the magenta color filter) but the red color filter (and the cyan color filter) or the blue color filter (and the yellow color filter), a color filter to be used at the transmission portion is appropriately selected depending on the color filter used at the reflection portion.

Particularly, in the case of using the green color filter at the reflection portion, the cell thicknesses at the transmission portion and the reflection portion can be made equal.

The subpixel provided with no color filter or the magenta color filter is only required to permit display of achromatic color and red to blue on the basis of the ECB effect. Accordingly, in order to realize the display from black to blue in the reflection mode, it is sufficient to change the retardation of the liquid crystal layer (or the combination of the liquid crystal layer with the phase compensation plate) in the range from 0 nm to about 300 nm by control of voltage.

On the other hand, in the transmission mode, in order to effect display from black to white, it is sufficient to change the retardation of the liquid crystal layer (and the phase compensation plate) in the range from 0 nm to about 250 nm.

In other words, the cell thickness required in the reflection area is close to that required in the transmission area. Accordingly, it is possible to remarkably decrease a thickness of an interlayer insulating film compared with the current constitution. As a result, it becomes possible to Suppress an alignment defect which is liable to occur as a result of the cell thickness difference and a decrease in aperture ratio due to taper at the stepwise portion.

Alternatively, when the thickness of the liquid crystal layer is kept constant under a controllable condition up to 300 nm and the control range by the voltage in the transmission mode is limited to a range from 0 nm to 250 nm, it is not necessary to form the interlayer insulating film. As a result, a simplified photolithographic process-can be realized to reduce the production cost. Further, uniform alignment can be readily realized, thus improving the aperture ratio.

In the present invention, similarly as in the color display mode described in the above mentioned International Publication (WO2004-042687 A2), it becomes possible to reduce the number of color filter processes from 3 times as in the conventional mode to 2 times, thus resulting in cost reduction. Further, it is not necessary to give the cell thickness difference in the pixel, so that a process load is alleviated.

In the case of using the magenta color filter at the transmission portion in combination, compared with the conventional time-division color display mode, it is possible to decrease the drive frequency. As a result, it is not necessary to employ the high-speed liquid crystal mode to allow a wide choice of options of liquid crystal modes. In the present invention, color mixing by time division is utilized, so that it is possible to obtain a high light utilization efficiency even at the transmission portion.

On the other hand, even in the case of using the liquid crystal display apparatus of the present invention in the above described display mode as the transmission-type liquid crystal display apparatus, a transmittance of the liquid crystal layer is high. As a result, power consumption of the back light, required to provide the same luminance value as in the conventional one may be low. For this reason, the transmission-type liquid crystal display device may suitably be used from the viewpoint of low power consumption of the back light.

Further, the display device of the present invention can be used for motion picture display.

The color display device of the present invention may also be suitably applicable to a projection-type display device requiring a high light utilization efficiency.

(Applicable Liquid Crystal Display Mode)

The present invention is applicable to various display modes described below.

In a vertical alignment (VA) mode, the liquid crystal molecules are substantially homeotropically (vertically) aligned with respect to the substrate surface under no voltage application and are inclined from the homeotropically aligned state to change the retardation.

IN an optically compensated bend (OCB) mode, the liquid crystal molecules in the liquid crystal layer are colored in alignment state between a bend alignment state and a substantially homeotropic (vertical) alignment state to change the retardation, so that the present invention is applicable to the OCB mode similarly as in the case of the VA mode. It is said that the OCB mode is a highest-speed mode among display modes using a nematic liquid crystal, thus being most suitable display mode for the FSC mode in the present invention.

Further, in the present invention, the display colors based on the change in retardation is utilized, so that a change in hue depending on a viewing angle must be taken into consideration. However, the progress of LCD development in these days is remarkable, so that it is not too much to say that the problem of viewing angle dependency is substantially solved in color liquid crystal display using the RCB color filter method. For example, in the OCB mode, it has been reported that the change in retardation due to the change in viewing angle is suppressed by a self-compensation effect by bend alignment. Further, by the progress of development of a phase-difference film in an STN mode, the viewing angle characteristic is remarkably improved. Also in these OCB and STN modes, it is possible to realize the coloring phenomenon based on the ECB effect by appropriately setting the amount of retardation, so that the constitution of the present invention is applicable thereto.

(Other Constitutional Requirements)

The liquid crystal display apparatus of the present invention can be driven by any of a direct drive method, a simple matrix drive method, and an active matrix drive method.

In the present invention, the substrate used may be formed of glass or plastics. In the case of the transmission-type display device, both the pair of substrates are required to be light transmissive. On the other hand, in the case of the reflection-type display device, as a supporting substrate, it is also possible to use a substrate through which light does not pass.

Further, the substrate used may have flexibility.

In the above description, such a constitution that the upper and lower electrodes are disposed is principally described but the display mode in the present invention is applicable irrespective of the direction of voltage application, e.g., as in a mode in which a horizontal electric field is applied, such as an in-plane switching (IPS) mode, so long as the display mode is capable of changing the retardation value of the liquid crystal layer.

In the case of using the reflection-type display device, it is possible to employ various reflection plates, such as so-called front scattering plate comprising a scattering plate which is provided with a mirror reflection plate as a reflection plate and disposed outside the liquid crystal layer, or a so-called directional pixel plate having directivity by appropriately shaping a reflection surface.

In the above embodiments the vertical alignment (VA) mode is described as an example but the present invention is applicable to any mode, utilizing the change in retardation by voltage application, such as a homogeneous alignment mode, a HAN (hybrid aligned nematic) mode, or the OCB mode.

Further, in the above embodiments, such a normally black constitution that black display is effected at the time of no voltage application is described exemplarily. This normally black constitution can be realized by laminating a display layer, which does not assume birefringence in an in-plane direction of substrate under no voltage application, on a circular polarization plate. However, in the present invention, it is also possible to use such a normally white constitution that white display is effected at the time of no voltage application by replacing the circular polarization plate with an ordinary linear polarization plate. Alternatively, it is possible to use such a constitution that chromatic display is effected at the time of no voltage application by laminating a uniaxial phase-difference plate or the like on either one of the above constitutions. In this case, it is possible to display black or white by changing the alignment direction of liquid crystal molecules in such a direction that an amount of retardation of the laminated uniaxial phase-difference plate is cancelled by voltage application.

Further, in the present invention, the multi-color display is effected with the high light utilization efficiency on the basis of such a basic principle that continuous gradation levels are obtained with a color filter in the case of the displaying green to which a human luminosity characteristic is best, so that it is also possible to adopt various alignment modes including such a liquid crystal mode as to provide a twisted alignment state as in the STN mode, and a guest-host mode.

Incidentally, in the present invention, description is made principally with respect to green and magenta which are complementary colors. However, other combinations of complementary colors, such as red and cyan, and blue and yellow can also be used in the transflective-type display apparatus of the present invention.

(Application to Apparatus (Devices) other than Liquid Crystal Display Apparatus)

In the above description, detailed explanation is made principally based on the ECB effect of the liquid crystal display apparatus. However, a basic concept of the present invention is in that, in the transflective-type liquid crystal display apparatus, at a part of pixels, color display is effected by applying the color filter to the monochromatic display mode and in other pixels, a display mode capable of changing hue is utilized. Accordingly, in the present invention, other than the above described constitution using the ECB effect, it is possible to apply any display mode so long as the display modes described above are applicable to the color display apparatus of the present invention.

Two examples of such a display apparatus will be described blow.

First, at page 71 of SID 97 Digest, such a display that a distance of a spacing between the interference layer and a substrate is changed to switch display and non-display modes of interference color has been reported. In this mode, ON/OFF switching is performed by external voltage control of a deformable aluminum film so that the film comes near to or away from the substrate.

Accordingly, also in the above spacing distance modulation device, it is possible to adopt the transmission mode and the reflection-mode, and the device has a modulation area in which a brightness can be changed between a maximum brightness and a minimum brightness which are available by the device and a modulation area in which a plurality of hues which are available by the device can be changed. To such a device, the present invention is applicable.

Secondly, in an electrophoretic display device described in U.S. Pat. No. 6,177,921, switching between a display state and a non-display state is performed by applying a voltage between a collection electrode and a display electrode to move electrophoretic particles in a transparent insulating liquid in parallel with a substrate surface. In this case, two types of color particles are used. To such a device, the present invention is also applicable.

Hereinbelow, the present invention will be described more specifically based on Examples.

(Device Structure)

First, a common device structure used in the following Comparative Examples and Examples will be described.

Figure 9:
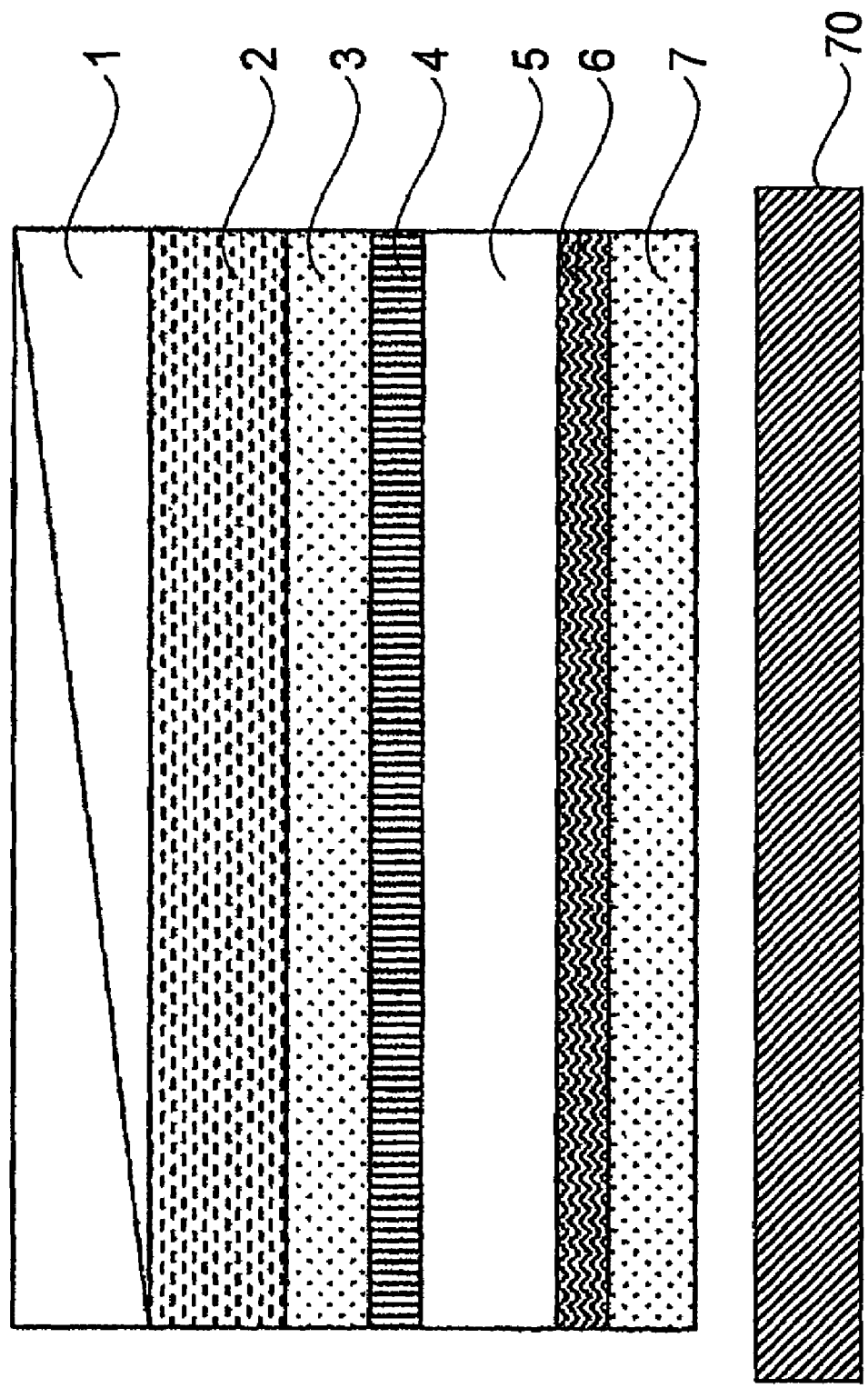
FIG. 9 is an explanatory view of a layer structure of a liquid crystal display device used in the present invention.

FIG. 9 shows a schematic sectional view showing a structure of a display device of the color display apparatus according to the present invention.

As one substrate 7, an active matrix substrate provided with TFTs (thin film transistors) was used, and the other substrate 3 was provided with a color filter (not shown). As a pixel electrode 6 on the active matrix substrate 7, a lamination electrode consisting of an aluminum electrode and a transparent ITO (indium-tin oxide) electrode was used in a reflection area (reflection portion) and a transparent ITO electrode was used in a transmission area (transmission portion). As an electrode 4 on the color filter formed substrate 3, a transparent ITO electrode was used.

At the surfaces of the electrodes 4 and 6, a vertical alignment film (not shown) was coated. The vertical alignment film was treated to have a pretilt angle of 1 degree from a normal to the substrate surface in a direction of inclination direction of liquid crystal molecules will provide an angle of 45 degrees from an absorption axis of a polarization plate 1 at the time of applying a voltage to the liquid crystal molecules. The upper and lower substrates 3 and 7 were applied to each other with a gap therebetween to form a cell. In the gap of the cell, when a liquid crystal material having a negative dielectric anisotropy ($-\Delta\epsilon$) (trade name "MLC-6608", mfd. by Merck & Co., Ltd.) as a liquid crystal 5 was injected, the liquid crystal molecules of the liquid crystal 5 were homeotropically (vertically) aligned with respect to the substrate surface under no voltage application.

Between an upper substrate (color filter substrate) 3 and a polarization plate 1, a wide-band $\lambda/4$ plate (phase-compensation plate capable of substantially satisfying $\frac{1}{4}$ condition in visible light region) was disposed as a phase-compensation plate 3, thereby to provide such a constitution that a dark state was given under no voltage application and a bright state was given under voltage application when reflection-type display was effected.

A light source 70 was constituted by LEDs (light-emitting diodes) of red (R), green (G), and blue (B), and was switched in a time-division manner.

A pixel shape, a color filter, a cell thickness, and so on were appropriately set as optimum constitutions depending on the following examples.

COMPARATIVE EXAMPLE 1

A transflective-type liquid crystal panel provided with RGB color filters was prepared. Each pixel was divided into three subpixels, which were provided with the red color filter, the green color filter, and the blue color filter, respectively.

With respect to the liquid crystal layer, the cell thickness was adjusted to 3 μm so as to provide a center wavelength of 550 nm and a retardation of 138 nm in a transmission area (276 nm in a reflection area) for a reflection spectrum characteristic at the time of applying a voltage of ±5 V.

The resultant cell structure was the same as that shown in FIG. 9.

When the thus prepared liquid crystal display device was subjected to image display by variously changing the voltage, a continuous gradation color was obtained depending on the applied voltage each at the respective subpixels of RGB, thus permitting full-color display.

However, a reflectance was about 16%, thus resulting in dark display.

When an areal ratio between the transmission portion and the reflection portion was 1:1, a reflectance was not ½ of the above described reflectance but was about 7% which was slightly smaller than the ½ value of the above described reflectance.

COMPARATIVE EXAMPLE 2

For comparison with the transflective-type display apparatus, a reflection-type display apparatus was prepared.

Similarly as in Comparative Example 1, each pixel was divided into three subpixels but only a green color filter was used at one subpixel as the color filter, and the remaining two subpixels were provided with no color filter because of color display based on retardation, thus being still transparent. The remaining two subpixels were disposed at an areal ratio of 1:2 in order to effect area gradation.

With respect to a retardation of the liquid crystal layer, the cell thickness was adjusted to 5 μm so that an amount of retardation at the time of applying a voltage of ±5 V to the transparent subpixels was 370 nm in order to effect blue display at the maximum retardation. A condition for the green subpixel was the same as in Comparative Example 1.

When such a liquid crystal display apparatus was subjected to image display by changing the voltage, at the subpixel with the green color filter, a change in transmittance depending on the applied voltage value was achieved to provide a complete continuous gradation characteristic.

On the other hand, at other subpixels with no green color filter, blue display was effected under application of 5 V and red display was effected under application of 3.8 V, the liquid crystal panel in this comparative example was displayable with respect to three primary colors. Further, in a voltage range of not more than 3 V, continuous gradation display depending on the applied voltage was effected.

In addition, with respect to red and blue, area gradation could be realized by changing the subpixels to be displayed. However, the number of gradation levels was 4, so that when a natural picture image was displayed, a resultant image was somewhat roughened.

Incidentally, the display device had a reflectance of 33% thus being two times that in Comparative Example 1. As a result, considerably bright white display could be effected.

COMPARATIVE EXAMPLE 3

Figure 10:
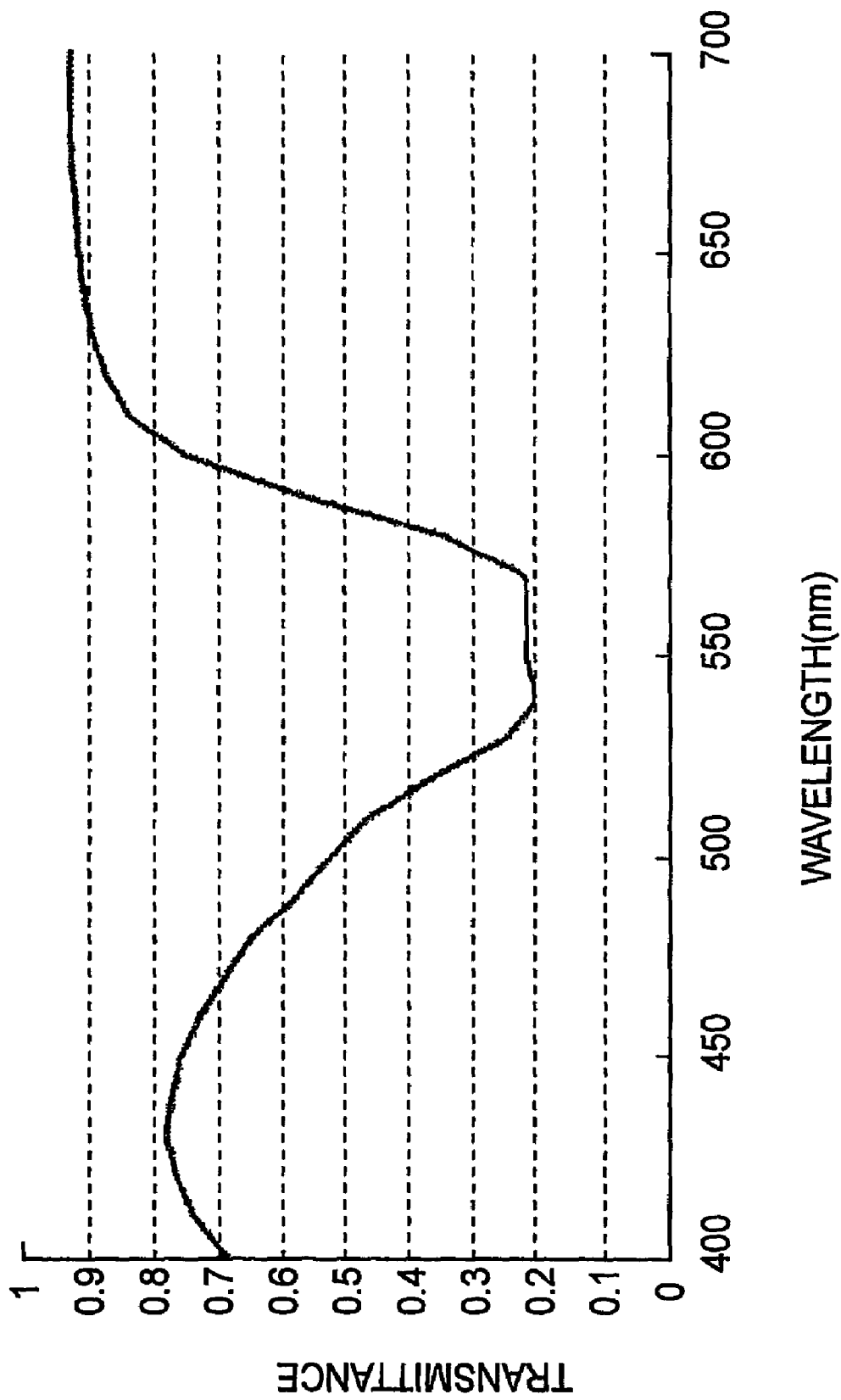
FIG. 10 is a spectrum chart of a magenta color filter used in a liquid crystal display device.

A liquid crystal display device (panel) was prepared in the same manner as in Comparative Example 2 except that the transparent pixels were changed to those having a pixel structure provided with a color filter (Model "CM-S571", mfd. by FUJI FILM Arch Co., Ltd.) having a transmission spectrum characteristic as shown in FIG. 10.

In the case of utilizing the ECB effect-based coloring phenomenon, a low color purity intrinsic to the retardation color is problematic. However, in the case of using the green color filter with a color filter of a color complementary to the color of the green color filter in combination, it is possible to cut a tail portion of emission spectrum of red and blue, so that an effect of increasing the color purity is achieved.

When the above prepared display device was supplied with a voltage at the subpixels provided with the color filter of color complementary to the color of the green color filter, similar as in Comparative Example 2, blue display was effected at 5 V and red display was effected at 3.8 V. As a result, it was confirmed that the liquid crystal panel of this comparative example was displayable with respect to three primary colors. Further, in a voltage range of not more than 3 V, continuous gradation display of magenta could be effected depending on the applied voltage.

The reflectance of the display device was 28%, thus resulting in considerably bright white display when compared with Comparative Example 1. With respect to color display in this Comparative Example, a color reproduction range on the chromaticity coordination diagram was largely extended compared with that in Comparative Example 2.

EXAMPLE 1

A liquid crystal display device was prepared in the same manner as in Comparative Example 1 except that each pixel was divided into four subpixels 72, 73, 74 and 75 as shown in FIG. 3(b). At the three subpixels 72, 73 and 75, a lamination electrode consisting of the aluminum electrode and the ITO electrode was disposed to provide a reflection display area. The remaining subpixel 74 was disposed in the subpixel 73 and was not provided with the aluminum electrode so as to provide a transmission display area.

Of the three subpixels for reflection display, a green color filter was used at one subpixel 72, and the remaining two subpixels 73 and 75 were provided with no color filter because of color display based on retardation. The remaining two subpixels 73 and 75 were disposed at an areal ratio of 1:2 in order to effect area gradation.

With respect to a retardation of the liquid crystal layer, the cell thickness was adjusted to 5 μm so that an amount of retardation at the time of applying a voltage of ±5 V to the transparent subpixels was 370 nm in order to effect red display and blue display in the reflection area. A condition for the green subpixel was the same as in Comparative Example 1.

When such a liquid crystal display device was capable of displaying an image in that manner shown in FIG. 4. At the subpixel with the green color filters a change in transmittance depending on the applied voltage value was achieved to provide a complete continuous gradation characteristic.

On the other hand, at two subpixels with no green color filter at the reflection portion, blue display was effected under application of 5 V and red display was effected under application of 3.8 V, the liquid crystal panel in this comparative example was displayable with respect to three primary colors. Further, in a voltage range of not more than 3 V, continuous gradation display depending on the applied voltage was effected.

In addition, with respect to red and blue, area gradation could be realized by changing the ON/OFF state of two subpixels 73 and 75.

Incidentally, the display device had a reflectance of 16% since there was no influence of an uneven portion in each pixel. As a result, considerably bright white display could be effected.

EXAMPLE 2

A liquid crystal display device was prepared in the same manner as in Example 1 except that the subpixel 73 was provided with a magenta color filter (MOdel "CB-571", mfd. by FUJI FILM Arch Co., Ltd.) having a temperature spectrum characteristic as shown in FIG. 10.

In the case of utilizing the ECB effect-based coloring phenomenon, a low color purity intrinsic to the retardation color is problematic similarly as in Comparative Example 2. However, in the case of using the green color filter with a color filter of a color complementary to the color of the green color filter in combination, it is possible to cut a tail portion of emission spectrum of red and blue, so that an effect of increasing the color purity is achieved.

When the above prepared display device was supplied with a voltage at the subpixels provided with the color filter of color complementary to the color of the green color filter, similar as in Comparative Example 2, blue display was effected at 5 V and red display was effected at 3.8 V. As a result, it was confirmed that the liquid crystal panel of this comparative example was displayable with respect to three primary colors. Further, in a voltage range of not more than 3 V, continuous gradation display of magenta could be effected depending on the applied voltage.

The reflectance of the display device was 14%, thus resulting in considerably bright white display although it is somewhat lower than in Example 1. With respect to color display in this example, a color reproduction range on the chromaticity coordination diagram was largely extended compared with that in Comparative Example 2.

Further, at the transmission portion, the light source was switched every 1/180 with respect to the three primary colors (RGB) and a corresponding display image was displayed in synchronism therewith, so that it was possible to effect full-color display.

EXAMPLE 3

A liquid crystal display device was prepared in the same manner as in Example 2 except that the display structure was changed to that shown in FIG. 5 while keeping the same areal ratio between the transmission portion and the reflection portion.

When the liquid crystal device was driven in the manner shown in FIG. 6, it was confirmed that color display was effected.

EXAMPLE 4

A liquid crystal display device was prepared in the same manner as in Example 2 except that the pixel structure was changed to that shown in FIG. 7 and that the liquid crystal was changed to that shown in FIG. 12 which continuously emitted green light and switched red light and blue light at a frequency of 120 Hz.

With respect to display at the transmission portion, the green subpixel 76 was supplied with an identical voltage during one frame period for light source switching and the magenta subpixel 79 was supplied with a voltage which was switched every half frame period. In this example, compared with Example 1, the drive frequency was lowered, thus alleviating a load of the drive system.

At the transmission portion, color display could be effected by the switching of light source every 1/120 sec for display of said and blue. Further, even in an area at a temperature of not more than room temperature, the response speed was not so insufficient, thus providing a display state with a good color reproducibility.

EXAMPLE 5

Figure 11:
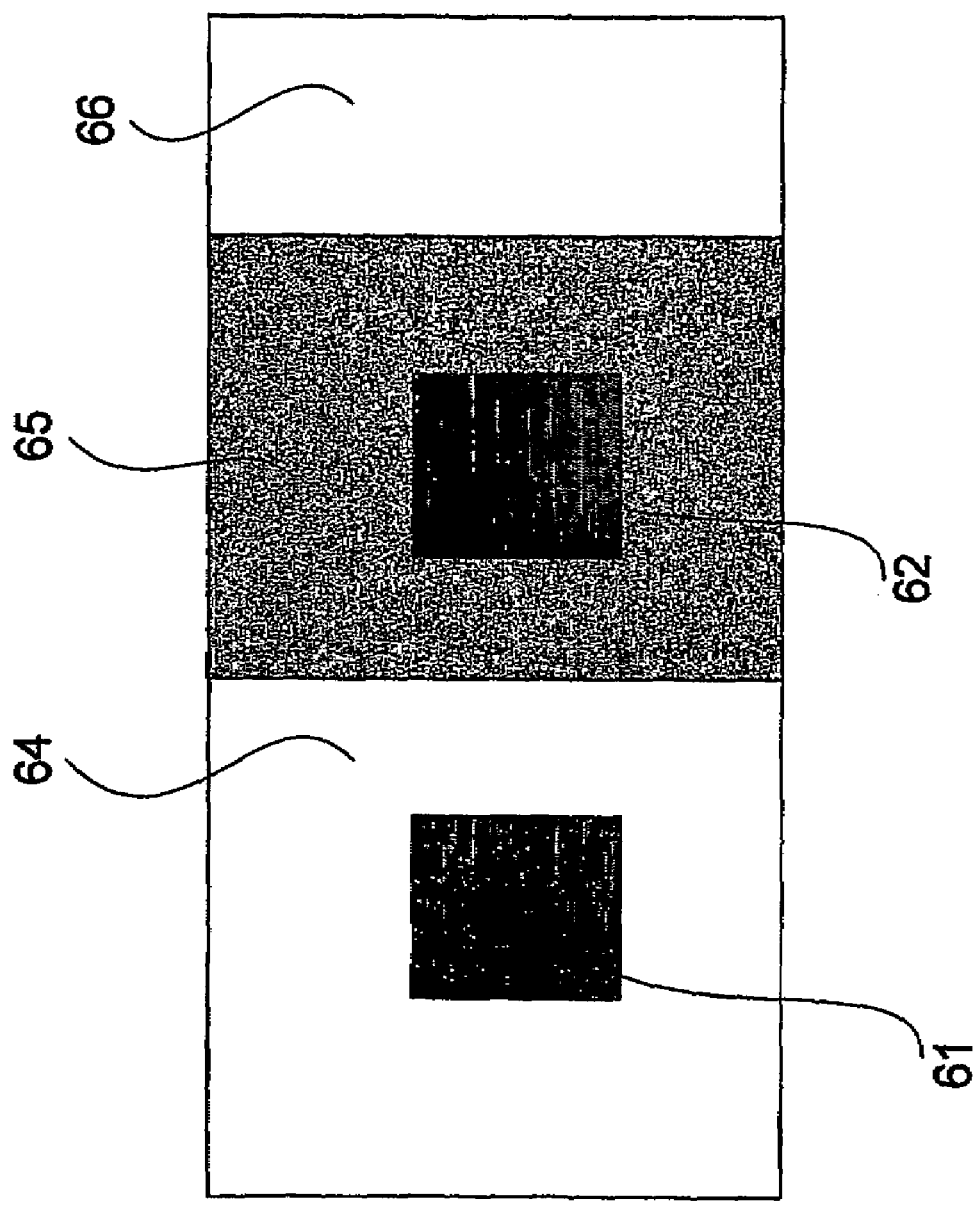
FIG. 11 is a schematic view showing a pixel structure of a liquid crystal display device used in Example 5 of the present invention.

In this example, a pixel structure shown in FIG. 11 is used.

Referring to FIG. 11, a green color filter and a magenta color filter are disposed on optical paths of lights passing through transparent electrodes 61 and 62, respectively, of ITO.

Reflection electrodes 64, 65 and 66 are formed of aluminum. On an optical path of light reflected by the reflection electrode 65, a green color filter is formed. The green color filter may be of such a reflection-type having a narrow color reproduction range or that for the transparent electrode 62 disposed at a part of the reflection electrode 65.

On the reflection electrodes 64 and 66, no color filter may be provided or a color filter of color, such as magenta, complementary to the color of the green color filter may be provided. In the latter case, a color purity of display color can be increased by utilizing the coloring phenomenon based on the ECB effect. Further, by use of such a (magenta) color filter, as described above, the field frequency required for the liquid crystal can be reduced.

Incidentally, in order to suppress a driver IC cost, it is possible to use the magenta subpixel without being divided. Alternatively, in order to increase the number of gradation colors, the magenta subpixel may be divided into a plurality of portions (e.g., three portions at an areal ratio of 1:2:4).

The transparent electrodes 61 and 62 may preferably be adjusted to have an appropriate areal ratio in view of a light source luminance and a light emission duty. Further, the reflection electrodes 64 and 66 may preferably have an areal ratio of 1:2. It is also possible to finely adjust these areal ratios in view of a transmittance balance of the color filters. An areal ratio between a first subpixel constituted by the reflection electrodes 64 and 66 and a second subpixel constituted by the reflection electrode 65 may preferably be appropriately adjusted so as to provide an optimum color balance depending on a wavelength transmission spectrum characteristic of the color filter at the second subpixel.

Further, when the first subpixel at which the ECB effect-based coloring phenomenon is utilized is area-divided, it is preferable that such shape and arrangement of pixel that a color gravity is not deviated every gradation level (not shown).

In an ordinary transflective-type liquid crystal display device, in many cases, an identical voltage is applied to the transparent electrodes 61 and 62 as transmission subpixels and the reflection electrodes 64, 65 and 66 as reflection subpixels, respectively. However, in the present invention, the display condition is different between the reflection made and the transmission mode, so that these fine subpixels may preferably be constituted to be independently controlled by a voltage.

Incidentally, only for green, it is also possible to adopt the constitution described in the above mentioned U.S. Pat. No. 6,466,280. In this case, a common voltage may also be applied to the transparent electrode 61 and the reflection electrode 65.

However, when such a case that an environmental illuminance is low and the back light for the transflective-type liquid crystal display apparatus of the present invention is turned on is taken into consideration, it is considered that image information of the transmission subpixel is predominantly recognized visually as display information and that the back light is generally turned off in the case of a high environmental illuminance. For this reason, during a period in which the back light is turned off, when a desired information signal is applied to the reflection subpixels, it can be considered that it is possible to effect display with no problem even in such a constitution that the subpixels are independently supplied with a voltage.

As described above, in the transflective-type color display mode in the present invention, it becomes possible to realize a display device with a high light utilization efficiency. Further, according to the present invention, it is possible to realize display performances satisfying all the requirements of the transflective-type liquid crystal display device by effecting the red and blue display utilizing the ECB effect-based coloring phenomenon in the reflection area, the color display with the green color filter in the transmission area, and the color display utilizing color mixture of red and green in the time-division manner. In addition, it is not necessary to provide a two-times cell thickness difference in one pixel, so that it becomes possible to simultaneously satisfy a simplified process, uniform alignment, and a high aperture ratio.

In the above examples, the TFT is used in the drive substrate. However, instead of the TFT, it is possible to use MIM (metal-insulator-metal) or such a substrate constitution that a switching element is formed on a semiconductor substrate. It is also possible to change the active matrix drive method to the single matrix drive method or a plasma addressing drive method.

Further, in the above examples, the vertical alignment mode or the OCB mode is principally described but the constitutions of the present invention are applicable to any mode so long as it is a mode, utilizing a change in retardation under voltage application, such as the homogeneous alignment mode, the HAN mode, or the like. It is also possible to apply the above described liquid crystal alignment mode to such an alignment mode in which liquid crystal molecules are placed in a twisted alignment state as in the STN mode. In the present invention, smectic liquid crystal may be used instead of the nematic liquid crystal.

Further, similar effects as in the above described examples are achieved even by using such a mode as to change a spacing distance (being a thickness of air as a medium) of interference layer by mechanical modulation in place of the liquid crystal display device having the ECB effect. Further, it is also possible to attain the above described effects similarly as in the examples even when the particle movement-type display device having the above described constitution is employed as the display device of the color display apparatus of the present invention.

While the invention has been described with reference to the structures disclosed herein, it is not confined to the details set forth and this application is intended to cover such modifications or changes as may come within the purpose of the improvements or the scope of the following claims.

INDUSTRIAL APPLICABILITY

The color display apparatus according to the present invention is applicable to a monitor of a (personal) computer, a display device for cellular phone, electronic paper, etc.

The invention claimed is:

1. A color display apparatus, comprising:
a display panel which has a light reflection area and a light transmission area for each pixel, and
a light source for causing light to enter said display panel from a back surface of said display panel,
wherein the light reflection area comprises a plurality of subareas including a first subarea in which incident light is modulated and reflected in a brightness change range within which a brightness of a reflected light is variable and a hue change range within which a hue of a chromatic color assumed by a reflected light is variable, and a second subarea provided with a color filter in which incident light is modulated and reflected in a brightness change range within which a brightness of a reflected light is variable,
wherein in the light transmission area, the incident light is modulated in a brightness change range within which a brightness of a transmitted light is variable,
wherein said light source is periodically switched at least between two lights different in color, and
wherein said apparatus further comprises means for performing the modulation in the light transmission area in synchronism with the switching in color of said light source.

2. An apparatus according to claim 1, wherein the light transmission area is a transparent area provided with no color filter, and said light source successively and periodically emits three lights different in color each for ⅓ period of one period.

3. An apparatus according to claim 1, wherein the light transmission area comprises a transparent third subarea provided with no color filter and a fourth subarea provided with a color filter of a color identical to that of the color filter provided in the second subarea, and said light source successively emits three lights, each for ⅓ period of one period, which are different in color and includes a light passing through the color filter provided in the fourth subarea.

4. An apparatus according to claim 3, wherein the third subarea has an area equal to that of the fourth subarea.

5. An apparatus according to claim 1, wherein the first subarea is provided with a color filter of a color complementary to the color of the color filter in the second subarea, and the light transmission area comprises a third subarea provided with a color filter identical in color to the color filter in the first subarea and a fourth subarea provided with a color filter identical in color to the color filter in the second subarea.

6. An apparatus according to claim 5, wherein said light source causes light to enter said display panel so that it successively switches two lights different in color passing through the color filter in the third subarea and continuously and periodically emits a light of a single color passing through the color filter in the fourth subarea.

7. An apparatus according to claim 5, wherein said light source successively switches the at least two lights different in color in four periods including two periods in which two lights different in color pass through the color filter in the fourth subarea.

8. An apparatus according to claim 5, wherein the third subarea and the fourth subarea have an areal ratio of 2:1.

9. An apparatus according to claim 5, wherein the color of the color filter in the second subarea is green.

10. An apparatus according to claim 5, wherein said display panel is a liquid crystal display panel in which a cell thickness in the light reflection area is equal to a cell thickness in the light transmission area.

11. A color display apparatus, comprising:
a display panel in which incident light is modulated and reflected or transmitted at each pixel,
wherein said pixel has a plurality of areas including a first area in which incident light from a front surface of said display panel is modulated and reflected in a brightness change range within which a brightness of a reflected light is variable and a hue change range within which a hue of a chromatic color assumed by a reflected light is variable, a second area provided with a color filter in which incident light from the front surface of said display panel is modulated and reflected in a brightness change range within which a brightness of a reflected light is variable, and a third area in which incident light from a back surface is modulated and transmitted in a brightness change range within which a brightness of a transmitted light is variable to cause at least two lights different in color to successively and periodically pass through the third area.

12. An apparatus according to claim 11, wherein the third area is a single area through which lights of three primary colors successively and periodically pass.

13. An apparatus according to claim 11, wherein said pixel further has a fourth area with a color filter of a color identical in color to the color filter in the second area, and incident light from the back surface of said display panel is modulated in said brightness change range and transmitted to the front surface of said display panel, and wherein the third area is a single area through which two lights different in color from the color of the color filter in the fourth area successively and periodically pass.

* * * * *

UNITED STATES PATENT AND TRADEMARK OFFICE
CERTIFICATE OF CORRECTION

PATENT NO. : 7,358,943 B2  
APPLICATION NO. : 10/552760  
DATED : April 15, 2008  
INVENTOR(S) : Yasufumi Asao Page 1 of 1

It is certified that error appears in the above-identified patent and that said Letters Patent is hereby corrected as shown below:

COLUMN 10:

Line 65, "at" should read --as--.

COLUMN 13:

Line 31, "Suppress" should read --suppress--.
Line 39, "process-can" should read --process can--.

COLUMN 14:

Line 17, "IN" should read --In--.
Line 28, "is" should read --are--.

COLUMN 19:

Line 16, "(MOdel" should read --(Model--.

COLUMN 20:

Line 65, "made" should read --mode--.

COLUMN 22:

Line 43, "includes" should read --include--.

Signed and Sealed this

Twenty-fourth Day of March, 2009

JOHN DOLL
*Acting Director of the United States Patent and Trademark Office*